US012798692B2

(12) United States Patent
Wires et al.

(10) Patent No.: US 12,798,692 B2
(45) **Date of Patent: *Nov. 17, 2026**

(54) LAND VEHICLES INCORPORATING REINFORCEMENT STRUCTURES, SEATBELT TOWER ASSEMBLIES, AND SEAT FRAME ASSEMBLIES

(71) Applicant: Workhorse Group Inc., Sharonville, OH (US)

(72) Inventors: Donald L. Wires, Loveland, OH (US); Max Lupfer, Sharonville, OH (US); Ryan Doll, Sharonville, OH (US)

(73) Assignee: Workhorse Group Inc., Sharonville, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/562,463

(22) Filed: Mar. 10, 2026

(65) Prior Publication Data

US 2026/0200538 A1 Jul. 16, 2026

Related U.S. Application Data

(63) Continuation of application No. 18/829,761, filed on Sep. 10, 2024, now Pat. No. 12,570,363.

(51) Int. Cl.
*B62D 33/04* (2006.01)
*B60R 22/18* (2006.01)
*B62D 33/06* (2006.01)

(52) U.S. Cl.
CPC ............ *B62D 33/044* (2013.01); *B60R 22/18* (2013.01); *B62D 33/06* (2013.01)

(58) Field of Classification Search
CPC ........ B62D 33/044; B62D 33/06; B60R 22/18
(Continued)

(56) References Cited

U.S. PATENT DOCUMENTS 1,251,749 A 1/1918 Cilley
1,728,889 A 9/1929 Kemble
(Continued)

FOREIGN PATENT DOCUMENTS

CN 103359174 A 10/2013
CN 110884568 A 3/2020
(Continued)

OTHER PUBLICATIONS

International Search Report; International Searching Authority; International Patent Application No. PCT/US2021/012327; Mar. 9, 2021; 2 pages.
(Continued)

*Primary Examiner* — Jason D Shanske
*Assistant Examiner* — Caitlin Anne Miller
(74) *Attorney, Agent, or Firm* — Taft Stettinius & Hollister LLP

(57) ABSTRACT

Land vehicles are disclosed. A land vehicle includes a frame structure, a plurality of wheels supported by the frame structure, and a body supported by the frame structure. The frame structure includes an operator cage that at least partially defines an operator cabin and a rear compartment positioned rearward of the operator cage in a longitudinal direction. The body includes a first sidewall arranged on one side of the vehicle and a second sidewall arranged on another side of the vehicle opposite the first sidewall.

20 Claims, 12 Drawing Sheets

(58) Field of Classification Search
USPC ................................ 296/178, 187.01, 203.01
See application file for complete search history.

(56) References Cited

U.S. PATENT DOCUMENTS

| | | | | |
|---|---|---|---|---|
| 2,172,831 | A | 9/1939 | Philip | |
| 2,189,139 | A | 2/1940 | Fox | |
| 2,728,420 | A | 12/1955 | Wright et al. | |
| 2,797,954 | A | 7/1957 | Uhlenhaut | |
| 2,973,220 | A | 2/1961 | White | |
| 3,066,621 | A | 12/1962 | Dean et al. | |
| 3,696,732 | A | 10/1972 | Rodgers | |
| 4,159,832 | A | 7/1979 | Inbody | |
| 4,270,622 | A | 6/1981 | Travis | |
| 4,676,545 | A | 6/1987 | Bonfilio et al. | |
| 4,934,733 | A | 6/1990 | Smith et al. | |
| 5,168,963 | A | 12/1992 | Poncini | |
| 5,363,939 | A | 11/1994 | Catlin | |
| 5,363,969 | A | 11/1994 | Shen | |
| 5,628,438 | A | 5/1997 | Legrow | |
| 5,690,378 | A | 11/1997 | Romesburg | |
| 5,823,599 | A | 10/1998 | Gray | |
| 5,829,542 | A | 11/1998 | Lutz | |
| 6,015,198 | A | 1/2000 | Stair | |
| 6,893,046 | B2 | 5/2005 | Ledesma et al. | |
| 6,926,351 | B2 | 8/2005 | Telehowski et al. | |
| 6,954,152 | B1 | 10/2005 | Matthews | |
| 7,097,232 | B2 * | 8/2006 | Beaudry | B62D 31/02 180/311 |
| 7,651,153 | B2 | 1/2010 | Martin et al. | |
| 7,832,792 | B2 * | 11/2010 | Fillion | B62D 65/04 296/178 |
| 8,056,958 | B2 * | 11/2011 | Oriet | B60R 21/13 296/178 |
| 8,083,280 | B2 | 12/2011 | Muglia et al. | |
| 8,641,133 | B1 | 2/2014 | Scaringe et al. | |
| 8,651,292 | B2 | 2/2014 | Sunderland et al. | |
| 8,714,592 | B1 | 5/2014 | Thoreson et al. | |
| 9,103,535 | B1 | 8/2015 | Strobel et al. | |
| 9,168,818 | B2 | 10/2015 | Hirai et al. | |
| 9,540,050 | B2 | 1/2017 | Miller | |
| 9,550,414 | B2 | 1/2017 | Kudo et al. | |
| 9,988,102 | B2 | 6/2018 | LaRose et al. | |
| 10,464,617 | B2 * | 11/2019 | Findley | B62D 23/005 |
| 10,543,790 | B2 | 1/2020 | Marr, Jr. | |
| 10,801,169 | B2 | 10/2020 | Roy et al. | |
| 10,967,904 | B2 | 4/2021 | Penz et al. | |
| 11,161,560 | B2 * | 11/2021 | Anderson | B62D 63/025 |
| 11,186,318 | B2 | 11/2021 | Fisher | |
| 2004/0118643 | A1 | 6/2004 | Booher | |
| 2006/0158024 | A1 | 7/2006 | Wendl | |
| 2006/0273571 | A1 | 12/2006 | Matsumoto et al. | |
| 2007/0257570 | A1 | 11/2007 | Walter et al. | |
| 2008/0003321 | A1 | 1/2008 | Kerr et al. | |
| 2009/0032321 | A1 | 2/2009 | Marsh et al. | |
| 2010/0025132 | A1 | 2/2010 | Hill et al. | |
| 2010/0101900 | A1 | 4/2010 | Usui | |
| 2010/0108417 | A1 | 5/2010 | Gilmore | |
| 2010/0263954 | A1 | 10/2010 | Constans | |
| 2011/0017527 | A1 | 1/2011 | Oriel et al. | |
| 2013/0153343 | A1 | 6/2013 | Neudeck | |
| 2013/0241237 | A1 | 9/2013 | Dziuba et al. | |
| 2013/0341971 | A1 | 12/2013 | Masini et al. | |
| 2014/0054916 | A1 | 2/2014 | Knudtson et al. | |
| 2014/0083606 | A1 | 3/2014 | Masini et al. | |
| 2014/0159468 | A1 | 6/2014 | Heinen et al. | |
| 2014/0182954 | A1 | 7/2014 | Weber | |
| 2014/0203624 | A1 | 7/2014 | Hilton et al. | |
| 2015/0027795 | A1 | 1/2015 | Hirai et al. | |
| 2015/0291017 | A1 | 10/2015 | LaBiche | |
| 2015/0367721 | A1 | 12/2015 | Shiraki et al. | |
| 2016/0106073 | A1 | 4/2016 | Van der Linde | |
| 2017/0050514 | A1 | 2/2017 | Li | |
| 2017/0113716 | A1 | 4/2017 | Gong et al. | |
| 2017/0225715 | A1 | 8/2017 | Kobayashi et al. | |
| 2017/0305253 | A1 | 10/2017 | Perle et al. | |
| 2018/0037151 | A1 | 2/2018 | Bauer et al. | |
| 2018/0043895 | A1 | 2/2018 | Shami et al. | |
| 2018/0108891 | A1 | 4/2018 | Fees et al. | |
| 2018/0290627 | A1 | 10/2018 | Hariri et al. | |
| 2018/0337377 | A1 | 11/2018 | Stephens et al. | |
| 2018/0345777 | A1 | 12/2018 | Bimschein et al. | |
| 2019/0054895 | A1 | 2/2019 | Hall et al. | |
| 2019/0056005 | A1 | 2/2019 | Hall et al. | |
| 2019/0168678 | A1 | 6/2019 | Magnuson et al. | |
| 2019/0217764 | A1 | 7/2019 | Conny | |
| 2019/0389444 | A1 | 12/2019 | Kistner et al. | |
| 2020/0062183 | A1 | 2/2020 | Smith et al. | |
| 2020/0369334 | A1 | 11/2020 | Lee | |
| 2021/0171120 | A1 | 6/2021 | Kim et al. | |
| 2021/0206432 | A1 | 7/2021 | Willison | |
| 2026/0062037 | A1 * | 3/2026 | Ozerdim | B61D 7/02 |

FOREIGN PATENT DOCUMENTS

| | | | |
|---|---|---|---|
| DE | 19626901 | A1 | 1/1998 |
| DE | 102012101483 | A1 | 6/2013 |
| DE | 102015200737 | B4 | 6/2020 |
| DE | 102019109465 | A1 | 10/2020 |
| EP | 1538072 | A1 | 6/2005 |
| EP | 2552763 | A2 | 2/2013 |
| EP | 3174680 | A2 | 6/2017 |
| EP | 3689717 | A1 | 8/2020 |
| FR | 2698601 | A1 | 6/1994 |
| GB | 2479898 | A | 11/2011 |
| WO | 2016016662 | A2 | 2/2016 |

OTHER PUBLICATIONS

Written Opinion of the International Searching Authority; International Searching Authority; International Patent Application No. PCT/US2021/012327; Mar. 9, 2021; 8 pages.

International Search Report; International Searching Authority; International Patent Application No. PCT/US2021/012330; Mar. 9, 2021; 2 pages.

Written Opinion of the International Searching Authority; International Searching Authority; International Patent Application No. PCT/US2021/012330; Mar. 9, 2021; 9 pages.

International Search Report; International Searching Authority; International Patent Application No. PCT/US2021/012332; Mar. 24, 2021; 2 pages.

Written Opinion of the International Searching Authority; International Searching Authority; International Patent Application No. PCT/US2021/012332; Mar. 24, 2021; 7 pages.

Supplementary European Search Report; European Patent Office; European Application No. 21710384.5; Oct. 21, 2021; 12 pages.

International Search Report; International Searching Authority; International Patent Application No. PCT/US2022/014847; Mar. 8, 2022; 3 pages.

Written Opinion of the International Searching Authority; International Searching Authority; International Patent Application No. PCT/US2022/014847; Mar. 8, 2022; 6 pages.

International Search Report; International Searching Authority; International Patent Application No. PCT/US2022/014844; Mar. 16, 2022; 2 pages.

Written Opinion of the International Searching Authority; International Searching Authority; International Patent Application No. PCT/US2022/014844; Mar. 16, 2022; 7 pages.

International Search Report; International Searching Authority; International Patent Application No. PCT/US2022/014851; Apr. 25, 2022; 2 pages.

Written Opinion of the International Searching Authority; International Searching Authority; International Patent Application No. PCT/US2022/014851; Apr. 25, 2022; 7 pages.

International Search Report; International Searching Authority; International Patent Application No. PCT/US2022/014852; Apr. 18, 2022; 2 pages.

Written Opinion of the International Searching Authority; International Searching Authority; International Patent Application No. PCT/US2022/014852; Apr. 18, 2022; 7 pages.

(56) References Cited

OTHER PUBLICATIONS

Extended European Search Report; European Patent Office; European Patent Application No. 22153661.8; Jul. 6, 2022; 11 pages.

Partial European Search Report (R. 64 EPC); European Patent Office; European Patent Application No. 22153665.9; Aug. 18, 2022; 16 pages.

* cited by examiner

LAND VEHICLES INCORPORATING REINFORCEMENT STRUCTURES, SEATBELT TOWER ASSEMBLIES, AND SEAT FRAME ASSEMBLIES

CROSS-REFERENCE TO RELATED APPLICATIONS

This application is a continuing application of, and claims priority to, U.S. application Ser. No. 18/829,761, which was filed on Sep. 10, 2024. The contents of that application are incorporated herein by reference in their entirety.

TECHNICAL FIELD

The present disclosure generally relates to land vehicles adapted for use in delivery applications, and, more particularly, to electric delivery and utility vehicles.

BACKGROUND

Land vehicles adapted for use in delivery applications may have various shortcomings. In particular, electrically-powered delivery and utility vehicles may have certain drawbacks. For those reasons, among others, electrically-powered land vehicles suited for use in delivery applications that avoid the limitations of conventional components and/or systems remain an area of interest.

SUMMARY

The present disclosure may comprise one or more of the following features and combinations thereof.

According to one aspect of the present disclosure, a land vehicle may include a frame structure, a plurality of wheels, and a body. The frame structure may include an operator cage that at least partially defines an operator cabin and a rear compartment positioned rearward of the operator cage in a longitudinal direction. The plurality of wheels and the body may be supported by the frame structure. The body may include a first sidewall arranged on one side of the vehicle and a second sidewall arranged on another side of the vehicle opposite the first sidewall. At least one of the first sidewall and the second sidewall may include a side panel and a wall frame assembly mounted to an interior surface of the side panel that at least partially defines an interior space of the rear compartment. The wall frame assembly may include a plurality of trusses each defining at least one triangular form and a plurality of crossbars each extending in the longitudinal direction across the plurality of trusses.

In some embodiments, the plurality of trusses may include a first truss defining a first triangular form and a second truss defining a second triangular form, the first truss may be disposed rearward of the second truss in the longitudinal direction, and each of the first truss and the second truss may be at least partially defined by one oblique bar of the wall frame assembly. The first truss may be defined by a first vertical bar of the wall frame assembly, a first horizontal bar of the wall frame assembly, and the one oblique bar of the wall frame assembly, and the first triangular form may be a right triangle. The second truss may be defined by the one oblique bar of the wall frame assembly, a second oblique bar of the wall frame assembly, and one of the plurality of crossbars of the wall frame assembly, and the second triangular form may be an acute triangle.

In some embodiments, the plurality of trusses may include a first truss defining a first triangular form, a second truss defining a second triangular form, a third truss defining a third triangular form, and a fourth truss defining a fourth triangular form, the first truss may be disposed rearward of the second truss in the longitudinal direction, the second truss may be disposed rearward of the third truss in the longitudinal direction, and the third truss may be disposed rearward of the fourth truss in the longitudinal direction. Each of the third truss and the fourth truss may be at least partially defined by one oblique bar of the wall frame assembly. The third truss may be defined by a pair of vertical bars of the wall frame assembly, a third horizontal bar of the wall frame assembly, and the one oblique bar of the wall frame assembly, and the third triangular form may be a right triangle. The fourth truss may be defined by the one oblique bar of the wall frame assembly, a fourth vertical bar of the wall frame assembly, and one of the plurality of crossbars of the wall frame assembly, and the fourth triangular form may be a right triangle.

In some embodiments, the plurality of crossbars may include a first crossbar and a second crossbar spaced from the first crossbar in a vertical direction, and each of the first crossbar and the second crossbar may extend in the longitudinal direction beyond the plurality of trusses. The plurality of crossbars may include a third crossbar and a fourth crossbar spaced from the third crossbar in the vertical direction, and each of the third crossbar and the fourth crossbar may not extend in the longitudinal direction beyond the plurality of trusses. Each of the third and fourth crossbars may include one or more rack mounts for shelving.

According to another aspect of the present disclosure, a land vehicle may include a frame structure, a plurality of wheels, and a seatbelt tower assembly. The frame structure may include an operator cage that at least partially defines an operator cabin and a rear compartment positioned rearward of the operator cage in a longitudinal direction. The plurality of wheels and the seatbelt tower assembly may be supported by the frame structure. The seatbelt tower assembly may be configured to secure a seatbelt for an operator in the operator cabin. The seatbelt tower assembly may include a bottom plate arranged proximate a floor of the rear compartment, an upright post coupled to the bottom plate that extends upwardly away from the bottom plate in a vertical direction, and a seatbelt mount coupled to the upright post proximate an upper end thereof to hold the seatbelt. The bottom plate may be affixed to at least one support bracket that is directly coupled to the frame structure proximate the floor.

In some embodiments, the seatbelt tower assembly may include a first oblique support leg coupled to the upright post and the bottom plate and a second oblique support leg coupled to the upright post and a mount plate of the seatbelt tower assembly that is spaced from the bottom plate. The first oblique support leg may be arranged in direct contact with a first face of the upright post, and the second oblique support leg may be arranged in direct contact with a second face of the upright post arranged opposite the first face. The seatbelt tower assembly may include a bulkhead plate arranged in direct contact with the second face of the upright post, and the bulkhead plate may be coupled to a vertical bulkhead of the land vehicle that at least partially closes off the operator cabin from an interior space of the rear compartment. Additionally, in some embodiments, the bottom plate may be affixed to a first support bracket that is directly coupled to the frame structure proximate the floor and a second support bracket that is directly coupled to the frame structure proximate the floor.

In some embodiments, the land vehicle may include a seat frame assembly supported by the frame structure that is configured to support a seat for a passenger in the operator cabin, and the seat frame assembly may include a forward mounting plate arranged proximate the floor, a rear mounting plate arranged proximate the floor and rearward of the forward mounting plate in the longitudinal direction, an upright post coupled to the forward mounting plate that extends upwardly away from the forward mounting plate in the vertical direction, and an oblique support leg coupled to the upright post and the rear mounting plate. The forward mounting plate may be affixed to a first support bracket that is directly coupled to the frame structure proximate the floor. The rear mounting plate may be affixed to a second support bracket that is directly coupled to the frame structure proximate the floor.

According to yet another aspect of the present disclosure, a land vehicle may include a frame structure, a plurality of wheels, a body, and a seatbelt tower assembly. The frame structure may include an operator cage that at least partially defines an operator cabin and a rear compartment positioned rearward of the operator cage in a longitudinal direction. The plurality of wheels, the body, and the seatbelt tower assembly may be supported by the frame structure. The body may include a first sidewall arranged on one side of the vehicle and a second sidewall arranged on another side of the vehicle opposite the first sidewall. The seatbelt tower assembly may be configured to secure a seatbelt for an operator in the operator cabin. At least one of the first sidewall and the second sidewall may include a side panel and a wall frame assembly mounted to an interior surface of the side panel that at least partially defines an interior space of the rear compartment. The wall frame assembly may include a plurality of trusses each defining at least one triangular form and a plurality of crossbars each extending in the longitudinal direction across the plurality of trusses. The seatbelt tower assembly may include a bottom plate arranged proximate a floor of the rear compartment, an upright post coupled to the bottom plate that extends upwardly away from the bottom plate in a vertical direction, and a seatbelt mount coupled to the upright post proximate an upper end thereof to hold the seatbelt. The bottom plate may be affixed to at least one support bracket that is directly coupled to the frame structure proximate the floor.

These and other features of the present disclosure will become more apparent from the following description of the illustrative embodiments.

BRIEF DESCRIPTION OF THE FIGURES

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF ILLUSTRATIVE EMBODIMENTS

Figure 1:
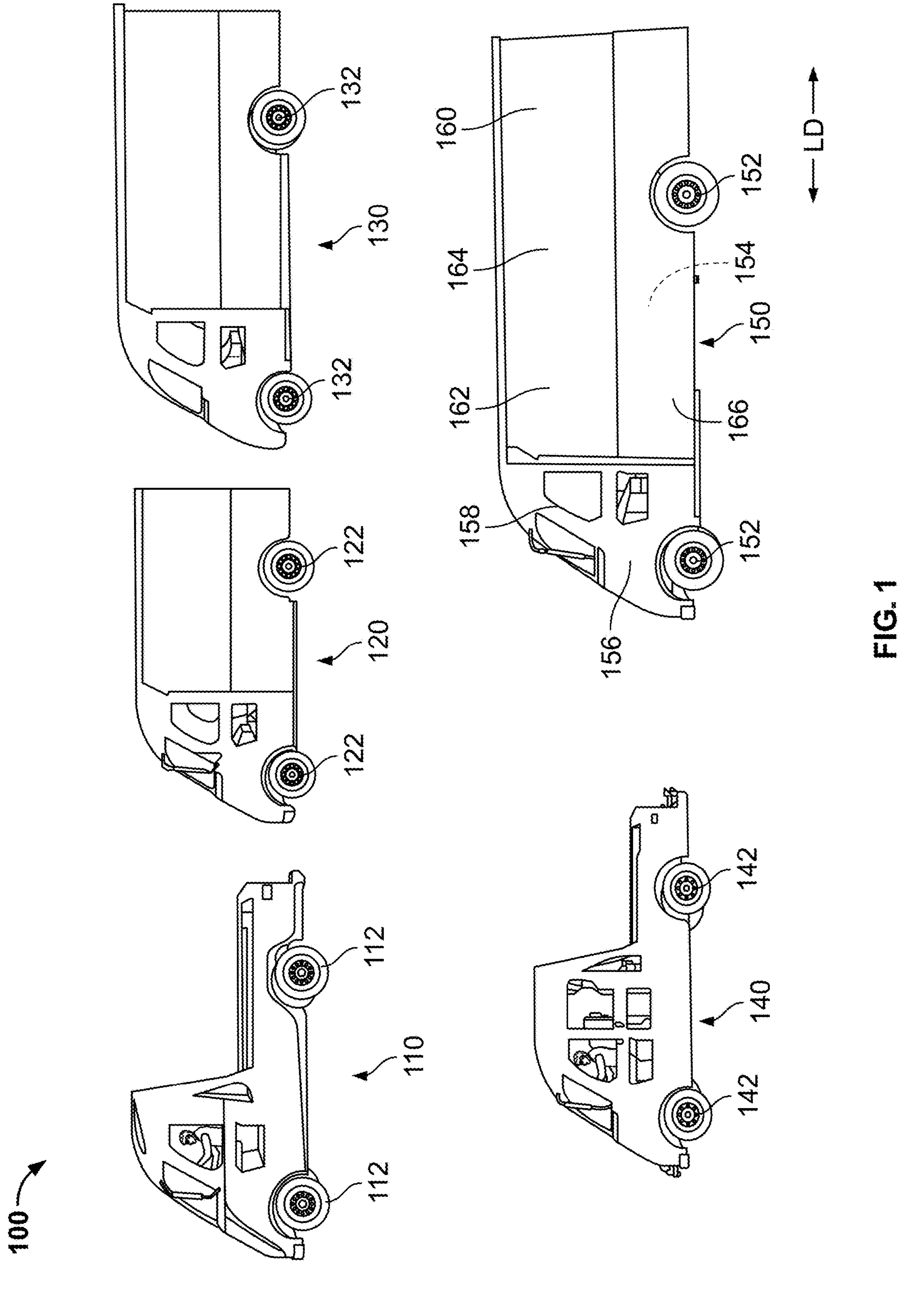
FIG. 1 depicts side elevation views of a number of electric vehicles that may incorporate reinforcement structures, seatbelt tower assemblies, and/or seat frame assemblies according to certain embodiments of the disclosure.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features, such as those representing devices, modules, instructions blocks and data elements, may be shown in specific arrangements and/or orderings for ease of description. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

In some embodiments, schematic elements used to represent blocks of a method may be manually performed by a user. In other embodiments, implementation of those schematic elements may be automated using any suitable form of machine-readable instruction, such as software or firmware applications, programs, functions, modules, routines, processes, procedures, plug-ins, applets, widgets, code fragments and/or others, for example, and each such instruction may be implemented using any suitable programming language, library, application programming interface (API), and/or other software development tools. For instance, in some embodiments, the schematic elements may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others, for example.

Further, in the drawings, where connecting elements, such as solid or dashed lines or arrows, are used to illustrate a connection, relationship, or association between or among two or more other schematic elements, the absence of any such connection elements is not meant to imply that no connection, relationship, or association can exist. In other words, some connections, relationships, or associations between elements may not be shown in the drawings so as not to obscure the disclosure. In addition, for ease of illustration, a single connecting element may be used to represent multiple connections, relationships, or associations between elements. For example, where a connecting element represents a communication of signals, data or instructions, it should be understood by those skilled in the art that such element may represent one or multiple signal paths (e.g., a bus), as may be needed, to effect the communication.

Referring now to FIG. 1, an illustrative line 100 of land vehicles includes a plurality of land vehicles. In the illustrative embodiment, the land vehicle line 100 includes, but is not limited to, a two-passenger flatbed utility vehicle 110 having wheels 112, a 650 cubic foot capacity delivery vehicle 120 having wheels 122, a 1000 cubic foot capacity delivery vehicle 130 having wheels 132, a six-passenger flatbed utility vehicle 140 having wheels 142, and a 1200 cubic foot capacity delivery vehicle 150 having wheels 152. In some embodiments, the land vehicle line 100 may be similar to the vehicle line 100 discussed in U.S. Pat. No. 11,400,982, which issued on Aug. 2, 2022, and which is incorporated by reference herein in its entirety. However, in some embodiments, the land vehicle line 100 may include any vehicle having a capacity within a particular range, such as a range of from 400 cubic feet to 1400 cubic feet, for example. Additionally, in some embodiments, the land vehicle line 100 may include a vehicle similar to the vehicle 100 discussed in U.S. Pat. No. 11,440,456, which issued on Sep. 13, 2022, and which is incorporated by reference herein in its entirety.

Using the land vehicle 150 as an illustrative example, the vehicle 150 includes a frame structure or chassis 154 (shown in phantom in FIG. 1) having an operator cage 156 that at least partially defines an operator cabin 158 and a rear compartment 160. In some embodiments, the frame structure 154, or any frame structure of any vehicle included in the vehicle line 100 for that matter, may be substantially similar to the frame structure 710 described below with reference to FIGS. 7A and 7B. In any case, in the illustrative example, the wheels 152 are supported by the frame structure 154, and the rear compartment 160 is positioned rearward of the operator cage 156 in a longitudinal direction indicated by arrow LD.

The illustrative land vehicle 150 also includes a body 162 supported by the frame structure 154 that has a sidewall 164 arranged on a side 166 of the vehicle 150 and another sidewall (not shown) arranged on another side of the vehicle 150 opposite the side 166. In some embodiments, at least one of the sidewalls of the vehicle 150 includes, or is identical or substantially identical to, the sidewall 200 described below with reference to FIG. 2. Additionally, in some embodiments, each one of the sidewalls of the vehicle 150 includes, or is identical or substantially identical to, the sidewall 200.

As will be apparent from the discussion that follows, the sidewall 200 includes a side panel 210 and a wall frame assembly 230 mounted to an interior surface 212 of the side panel 210. The interior surface 212 at least partially defines an interior space 214 (shown in phantom). In some embodiments, using the vehicle 150 as an example, the interior space 214 is enclosed and at least partially defined by the rear compartment 160. The illustrative wall frame assembly 230 includes a plurality of trusses 240 that each define at least one triangular form 242. Additionally, the wall frame assembly 230 includes a plurality of crossbars 250 that each extends in a longitudinal direction (e.g., the direction indicated by arrow LD) across the plurality of trusses 240.

At least in some embodiments, the wall frame assembly 230 provides structural rigidity and/or stiffness to the sidewall 200. In some cases, each of the trusses 240 includes, or is otherwise embodied as, an assemblage of straight or planar beams, bars, members, rods, or the like that are connected at joints, nodes, panel points, or the like. In those cases, each of the trusses 240 provides a single plane framework of rigid structures physically connected at joints in a stable configuration to form a series of forms (e.g., triangular forms) spanning a particular distance. As such, the trusses 240 may provide, or otherwise define, reinforcement structures incorporated into the sidewall 200. Because the trusses 240 are secured to a frame structure (e.g., the frame structure 710) of the land vehicle as indicated below, at least in some embodiments, the trusses 240 provide structural reinforcement that may resist bending or torsional forces applied to the frame structure 710 in use of the vehicle.

Further, at least in some embodiments, each of the crossbars 250 provides or imparts structural rigidity and/or stiffness to the sidewall 200. In some cases, the crossbars 250 and the trusses 240 cooperate to provide increased or improved structural rigidity and/or stiffness to the sidewall 200 compared to other configurations, such as configurations in which one or more of the crossbars 250 and the trusses 240 are omitted, for example. Further still, as described in greater detail below, each of the crossbars 250 may provide or defines a mounting structure (e.g., a rack) for various accessories that may be disposed in the interior space 214, such as shelving, for example.

Figure 7A:
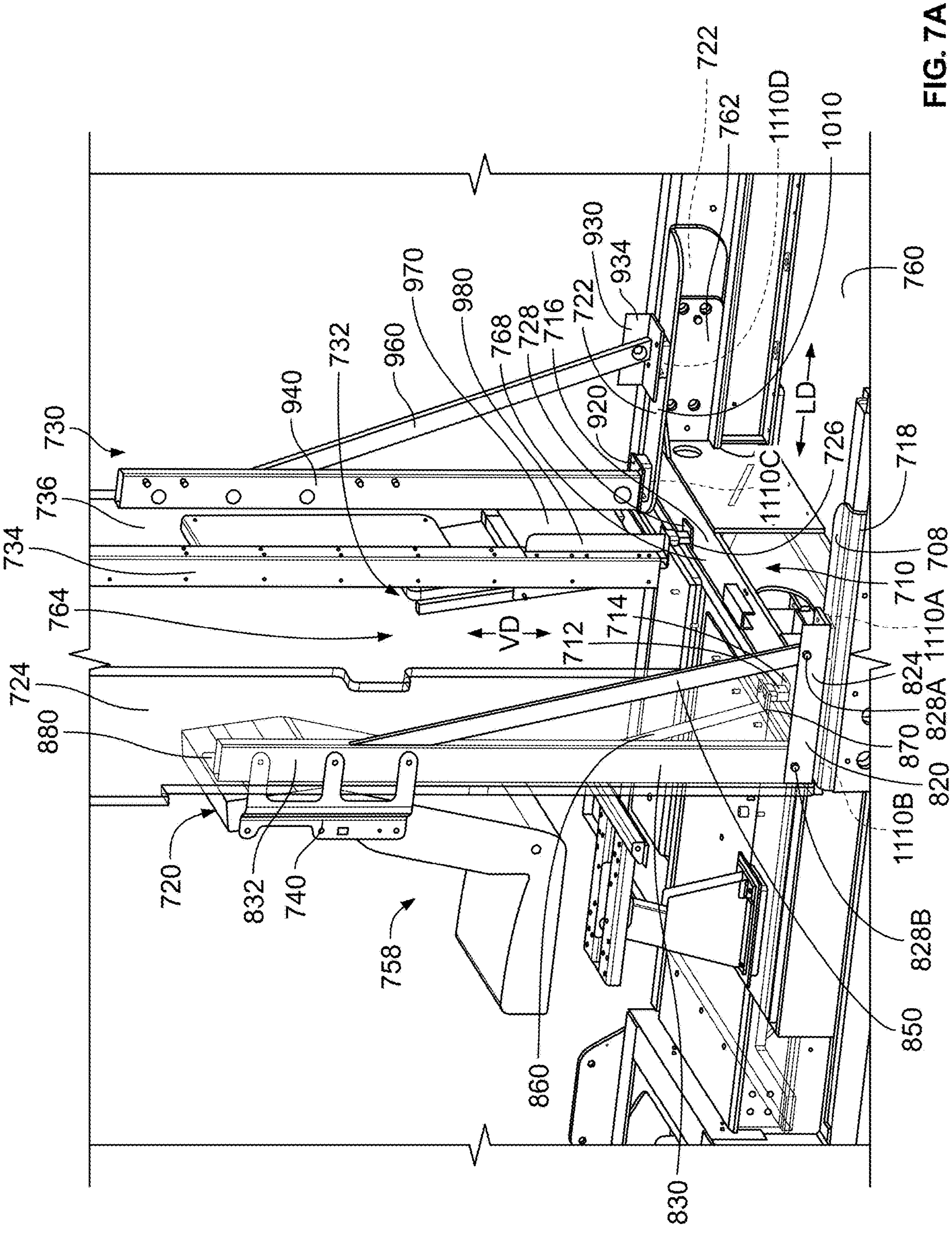
FIG. 7A is a perspective view of a seatbelt tower assembly and a seat frame assembly incorporated into one or more of the electric vehicles of FIG. 1 according to certain embodiments of the disclosure.
Figure 8B:
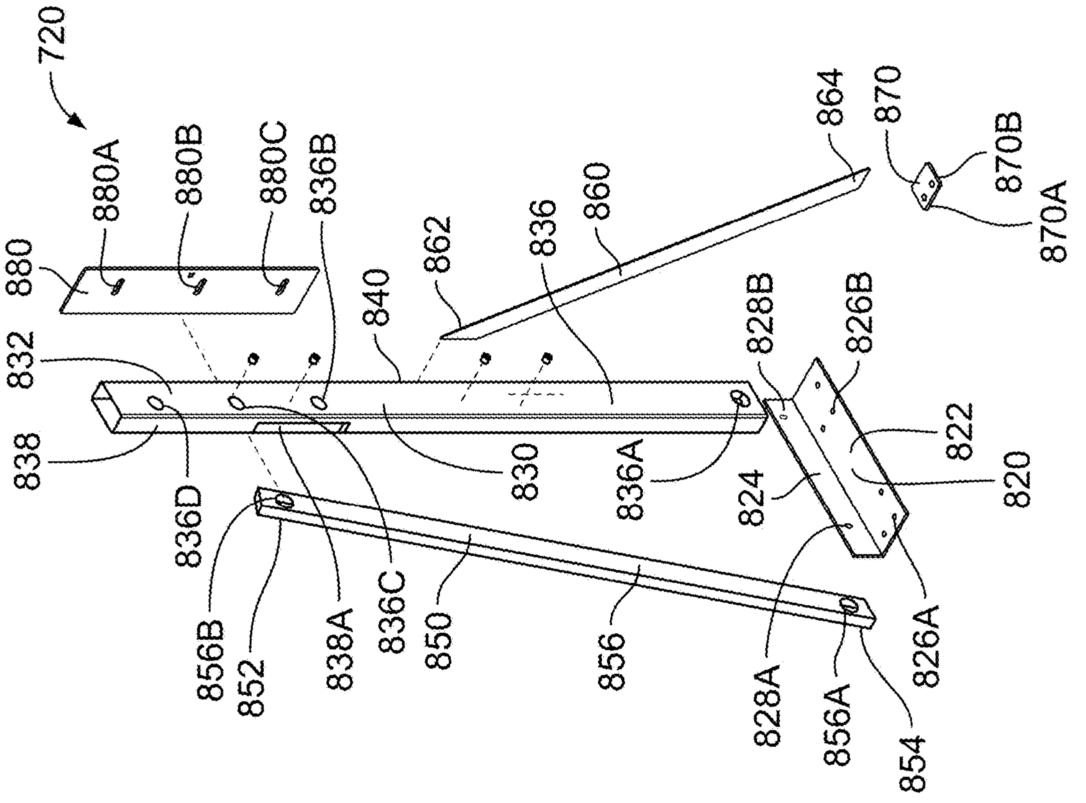
FIG. 8B is an exploded assembly view of the portion of the seatbelt tower assembly shown in FIG. 8A.
Figure 8A:
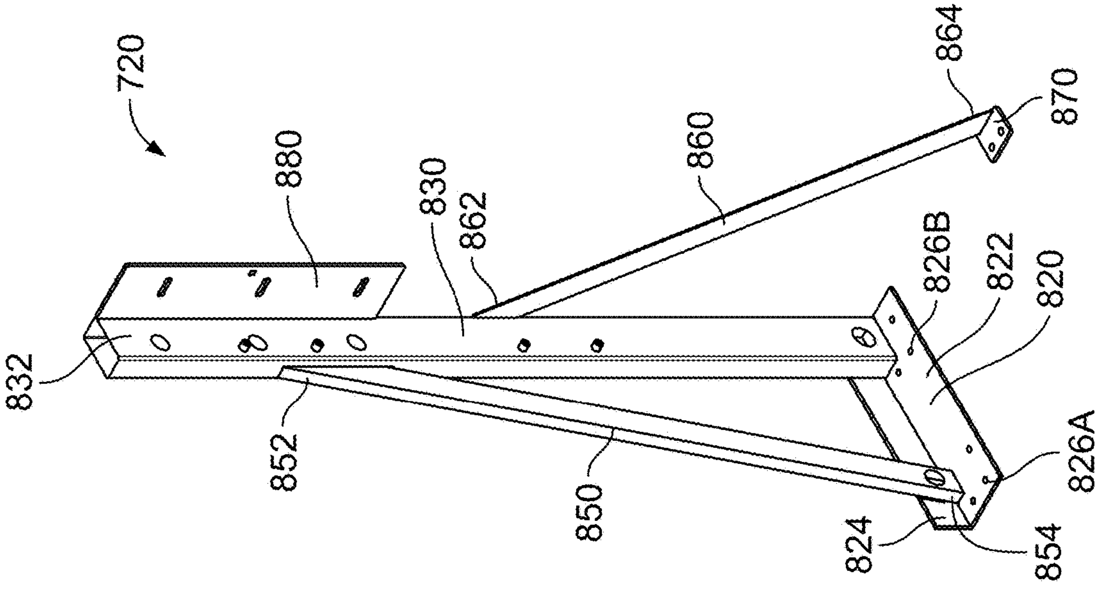
FIG. 8A is a perspective view of at least a portion of the seatbelt tower assembly shown in FIG. 7 which is removed from the electric vehicle for the sake of simplicity.

As will also be apparent from the discussion that follows, in some embodiments, the land vehicle 150 includes the seatbelt tower assembly 720 described below with reference to FIGS. 7A, 8A, and 8B. The seatbelt tower assembly 720 is supported by the frame structure 710 and configured to secure a seatbelt (not shown) for an operator in an operator cabin 758 that is substantially similar to the operator cabin 158. As best seen in FIGS. 7A, 8A, and 8B, the illustrative seatbelt tower assembly 720 includes a bottom plate 820, an upright post 830, and a seatbelt mount 740.

In the illustrative embodiment, when installed in a land vehicle (e.g., the land vehicle 150), the bottom plate 820 is arranged proximate a floor 722 (shown in phantom) of a rear compartment 760 that is substantially similar to the rear compartment 160. The upright post 830 is coupled to the bottom plate 820 and extends upwardly away from the bottom plate 820 in a vertical direction indicated by arrow VD. The seatbelt mount 740 is coupled to the upright post 830 proximate an upper end 832 thereof to hold the seatbelt. The bottom plate 820 is affixed to at least one support bracket 1110 (see FIGS. 11A and 11B) that is directly coupled to the frame structure 710 proximate the floor 722.

In at least some embodiments, due to the connection between the bottom plate 820 of the seatbelt tower assembly 720 and the frame structure 710 at least partially established by the support bracket(s) 1110, loads or forces applied to the seatbelt tower assembly 720 may be transmitted primarily to the frame structure 710 rather than the floor 722. Put another way, at least in some cases, loads or forces applied to the seatbelt tower assembly 720 may be primarily transmitted to the frame structure 710 in such a manner that minimal amounts of loads or forces are borne by the floor 722. Consequently, at least in some cases, securement of the seatbelt tower assembly 720 to the frame structure 710 via the at least one support bracket 1110 achieves, or is otherwise associated with, a reduced magnitude of stresses applied to the floor 722 from the seatbelt tower assembly 720 compared to other configurations.

Referring again to FIG. 1, any of the vehicles included in the land vehicle line 100 may be embodied as, or otherwise include, an electric delivery vehicle, such as an electric delivery truck adapted for any use as a delivery vehicle, for example. In some embodiments, any of the vehicles included in the land vehicle line 100 may be embodied as, or otherwise include, an electric utility van.

Any of the vehicles included in the land vehicle line 100 may include one or more features of the electric vehicle described in U.S. Pat. No. 11,440,590, such as the impact management system 1200 (see FIG. 12), for example. Additionally, any of the vehicles included in the land vehicle line 100 may include one or more features of the electric vehicle described in U.S. Pat. No. 11,485,215, such as one or more electric motors 1400 (see FIG. 14), for example. Furthermore, any of the vehicles included in the land vehicle line 100 may include one or more features of the electric vehicle described in U.S. Pat. No. 11,591,032, such as brake systems 1500 (see FIG. 15), for example. The disclosures of those applications are incorporated herein by reference in their entireties.

Any of the vehicles included in the land vehicle line 100 may include a monocoque, such as one of the monocoques described in U.S. patent application Ser. No. 17/142,766. Furthermore, in some embodiments, a monocoque of any of the vehicles included in the land vehicle line 100 may be formed using a modular mold system, such as one of the modular mold systems described in U.S. patent application Ser. No. 17/142,766. Further still, in some embodiments, a monocoque of any of the vehicles included in the land vehicle line 100 may be formed according to the methods described in U.S. patent application Ser. No. 17/142,785. The disclosures of those applications are incorporated herein by reference in their entireties.

It should be appreciated that any of the vehicles included in the land vehicle line 100 may be employed in a variety of applications. In some embodiments, any of the vehicles included in the land vehicle line 100 may be embodied as, or otherwise included in, a fire and emergency vehicle, a refuse vehicle, a coach vehicle, a recreational vehicle or motorhome, a municipal and/or service vehicle, an agricultural vehicle, a mining vehicle, a specialty vehicle, an energy vehicle, a defense vehicle, a port service vehicle, a construction vehicle, and a transit and/or bus vehicle, just to name a few. Additionally, in some embodiments, any of the vehicles included in the land vehicle line 100 may be adapted for use with, or otherwise incorporated into, tractors, front end loaders, scraper systems, cutters and shredders, hay and forage equipment, planting equipment, seeding equipment, sprayers and applicators, tillage equipment, utility vehicles, mowers, dump trucks, backhoes, track loaders, crawler loaders, dozers, excavators, motor graders, skid steers, tractor loaders, wheel loaders, rakes, aerators, skidders, bunchers, forwarders, harvesters, swing machines, knuckleboom loaders, diesel engines, axles, planetary gear drives, pump drives, transmissions, generators, and marine engines, among other suitable equipment.

Figure 2:
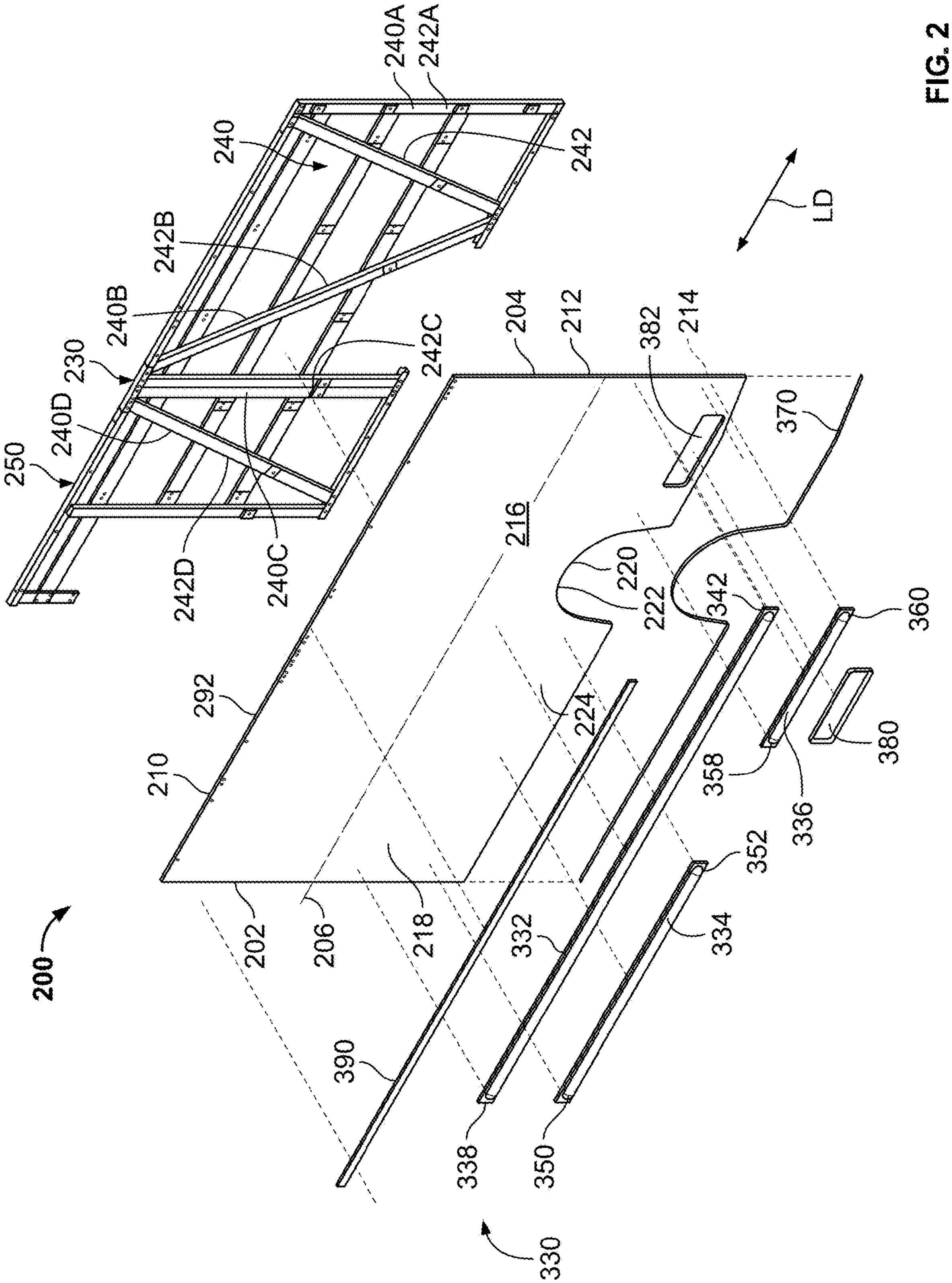
FIG. 2 is an exploded assembly view of a sidewall adapted for inclusion in one or more of the electric vehicles of FIG. 1 according to certain embodiments of the disclosure.
Figure 3:
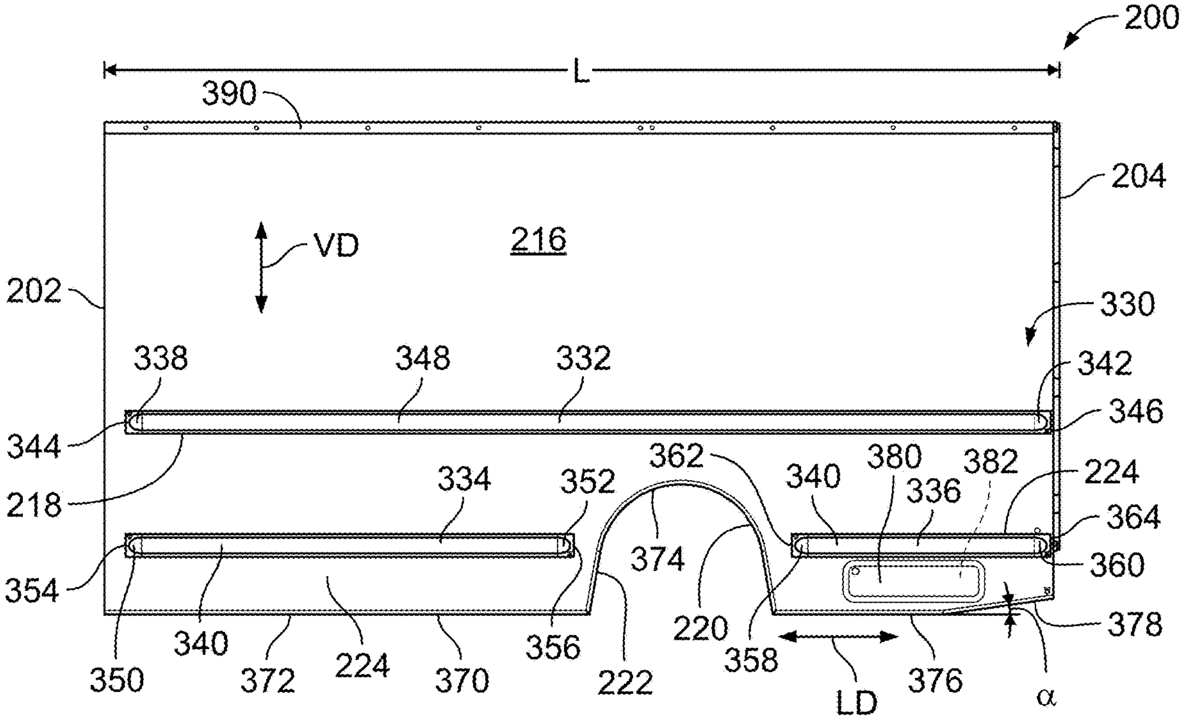
FIG. 3 is a front elevation view of the sidewall of FIG. 2 showing an exterior surface thereof.

Referring now to FIGS. 2 and 3, in the illustrative embodiment, the sidewall 200 includes an exterior panel assembly 330 mounted to an exterior surface 216 of the side panel 210 that is arranged opposite the interior surface 212. The exterior panel assembly 330 is therefore mounted to the side panel 210 opposite the wall frame assembly 230 in the illustrative arrangement. The sidewall 200 illustratively includes a cutout 220 that extends through the side panel 210 (i.e., through the surfaces 212, 216) and is at least partially defined by a lower edge 222 of the side panel 210. In at least some embodiments, the cutout 220 provides a well for at least partially accommodating one or more structural components of the vehicle, such as a wheel, a hub motor, a brake system, or combinations thereof. Regardless, the exterior panel assembly 330 and the wall frame assembly 230 are mounted to the side panel 210 so as not to extend into, or interfere with, the cutout 220 or any structures accommodated therein.

The exterior panel assembly 330 illustratively includes rub rails 332, 334, 336 mounted to the side panel 210 such that the rub rails 332, 334, 336 extend parallel to the longitudinal direction LD. As best seen in FIG. 3, the longitudinal direction LD is a horizontal or substantially horizontal direction relative to a support surface (not shown) on which the vehicle is positioned. In the illustrative embodiment, the rub rails 334, 336 are aligned or substantially aligned in a vertical direction VD that is perpendicular to the longitudinal direction LD. Consequently, the rub rails 334, 336 lie on a longitudinal axis 340 that extends parallel to the longitudinal direction LD. The rub rail 332 is spaced from each of the rub rails 334, 336 in the vertical direction VD and positioned closer to a midline 206 of the side panel 210 than each of the rub rails 334, 336.

In the illustrative embodiment, each of the rub rails 332, 334, 336 includes, or is otherwise embodied as, an elongated strip, bar, rail, beam, rod, or similar structure affixed to, and projecting outwardly away from, the exterior surface 216 of the side panel 210. Each of the rub rails 332, 334, 336 illustratively has a metallic construction. In other embodiments, however, each of the rub rails 332, 334, 336 may have another suitable construction, such as a polymeric construction, for example. In any case, the illustrative rub rails 332, 334, 336 are adapted to protect the exterior surface 216 against rubbing and/or degradation resulting from interaction with an external object in use of the vehicle.

As best seen in FIG. 3, the illustrative rub rail 332 is mounted to the exterior surface 216 such that the rub rail 332 extends substantially across an entire length L of the sidewall 200 measured in the longitudinal direction LD. In some embodiments, when mounted to the surface 216, the rub rail 332 extends all the way across the entire length L of the sidewall 200. Additionally, in some embodiments, the rub rail 332 is mounted to the exterior surface 216 such that the rub rail 332 is centered or substantially centered in the longitudinal direction LD across the surface 216. Regardless, in the illustrative embodiment, the rub rail 332 is affixed and/or adhered to a section 218 of the exterior surface 216. The section 218 of the exterior surface 216 extends continuously in the longitudinal direction LD and is devoid or substantially devoid of any readily observable notches, cutouts, or interruptions.

The exterior panel assembly 330 includes rail caps 338, 342 that are affixed to the section 218 of the exterior surface 216 such that the rub rail 332 extends between the rail caps 338, 342 in the longitudinal direction LD. In some embodiments, the rail cap 338 defines an end or end cap 344 of the rub rail 332, and the rail cap 342 defines an end or end cap 346 of the rub rail 332 arranged opposite the end cap 344. In any case, in the illustrative embodiment, the rail caps 338, 342 are aligned with the rub rail 332 in the vertical direction VD. The rail caps 338, 342 and the rub rail 332 lie on an axis 348 that extends parallel to the longitudinal direction LD.

The illustrative rub rail 334 is mounted to the exterior surface 216 such that the rub rail 334 extends only partway across the entire length L of the sidewall 200. In some embodiments, when mounted to the surface 216, the rub rail 334 extends across half, or approximately half, of the entire length L of the sidewall 200. In any case, in the illustrative embodiment, the rub rail 334 is affixed and/or adhered to a section 224 of the exterior surface 216 that is spaced from (e.g., located below) the section 218 in the vertical direction VD. The cutout 220 extends through the section 224 and therefore provides at least one interruption in the section 224. The rub rail 334 is mounted to the section 224 such that the rub rail 334 extends along the longitudinal axis 340 between the cutout 220 and a front end 202 of the sidewall 200.

The exterior panel assembly 330 includes rail caps 350, 352 that are affixed to the section 224 of the exterior surface 216 such that the rub rail 334 extends between the rail caps 350, 352 in the longitudinal direction LD. In some embodiments, the rail cap 350 defines an end or end cap 354 of the rub rail 334, and the rail cap 352 defines an end or end cap 356 of the rub rail 334 arranged opposite the end cap 354. In any case, in the illustrative embodiment, the rail caps 350, 352 are aligned with the rub rail 334 in the vertical direction VD. As such, the rail caps 350, 352 and the rub rail 334 lie on the longitudinal axis 340.

The illustrative rub rail 336 is mounted to the exterior surface 216 such that the rub rail 336 extends only partway across the entire length L of the sidewall 200. In some embodiments, when mounted to the surface 216, the rub rail 336 extends across one-third or one-fourth of the entire length L of the sidewall 200. In any case, in the illustrative embodiment, the rub rail 336 is affixed and/or adhered to the section 224 of the exterior surface 216. The rub rail 336 is mounted to the section 224 such that the rub rail 336 extends along the longitudinal axis 340 between the cutout 220 and a rear end 204 of the sidewall 200 that is arranged opposite the front end 202.

The exterior panel assembly 330 includes rail caps 358, 360 that are affixed to the section 224 of the exterior surface 216 such that the rub rail 336 extends between the rail caps 358, 360 in the longitudinal direction LD. In some embodiments, the rail cap 358 defines an end or end cap 362 of the rub rail 336, and the rail cap 360 defines an end or end cap 364 of the rub rail 336 arranged opposite the end cap 362. In any case, in the illustrative embodiment, the rail caps 358, 360 are aligned with the rub rail 336 in the vertical direction VD. As such, the rail caps 358, 360 and the rub rail 336 lie on the longitudinal axis 340.

In the illustrative embodiment, the exterior panel assembly 330 includes a guard edge 370 affixed to the lower edge 222 of the side panel 210. The guard edge 370 is affixed and/or adhered to the lower edge 222 such that the guard edge 370 defines a profile and contour complementary to, and identical or substantially identical to, the lower edge 222. In the illustrative embodiment, the guard edge 370 defines a lowermost structure of the sidewall 200 in the vertical direction VD.

The illustrative guard edge 370 includes, or is otherwise embodied as, an elongated strip, bar, rail, beam, or similar structure affixed to, and projecting outwardly away from in the vertical direction VD, the lower edge 222 of the side panel 210. The guard edge 370 illustratively has a metallic construction. In other embodiments, however, the guard edge 370 may have another suitable construction, such as a polymeric construction, for example. In some embodiments, the illustrative guard edge 370 is adapted to protect the lower edge 222 against rubbing and/or degradation resulting from interaction with an external object in use of the vehicle.

As best seen in FIG. 3, when mounted to the lower edge 222 of the side panel 210, the illustrative guard edge 370 defines interconnected guard segments 372, 374, 376, 378. The guard segment 372 extends from the front end 202 to the cutout 220 and is arranged parallel or substantially parallel to the longitudinal direction LD. The guard segment 374 extends from the guard segment 372 to the guard segment 376 and has an arcuate shape that at least partially defines the cutout 220. The guard segment 376 extends from the guard segment 374 to the guard segment 378 and is arranged parallel or substantially parallel to the longitudinal direction LD. The guard segment 378 extends from the guard segment 376 to the rear end 204 and defines an acute angle $\alpha$ relative to the longitudinal direction LD.

The exterior panel assembly 330 illustratively includes a vent plate 380 affixed and/or adhered to the exterior surface 216 of the side panel 210 and arranged between the rub rail 336 and the guard segments 376, 378 in the vertical direction VD. In some embodiments, the vent plate 380 is affixed and/or adhered to the section 224 of the exterior surface 216.

In any case, the vent plate 380 is affixed and/or adhered to the exterior surface 216 such that the vent plate 380 covers an opening 382 (shown in phantom) extending through the side panel 210.

In the illustrative embodiment, the exterior panel assembly 330 includes a trim rail 390 that is mounted to the exterior surface 216 of the side panel 210 such that the trim rail 390 and the guard edge 370 define, respectively, uppermost and lowermost structures of the sidewall 200 in the vertical direction VD. The illustrative trim rail 390 includes, or is otherwise embodied as, an elongated strip, bar, rail, beam, or similar structure affixed to an upper edge 292 of the side panel 210 that is arranged opposite the lower edge 222. The trim rail 390 illustratively has a metallic construction. In other embodiments, however, the trim rail 390 may have another suitable construction, such as a polymeric construction, for example. In some embodiments, the illustrative trim rail 390 is adapted to protect the upper edge 292 against rubbing and/or degradation resulting from interaction with an external object in use of the vehicle.

Figure 4:
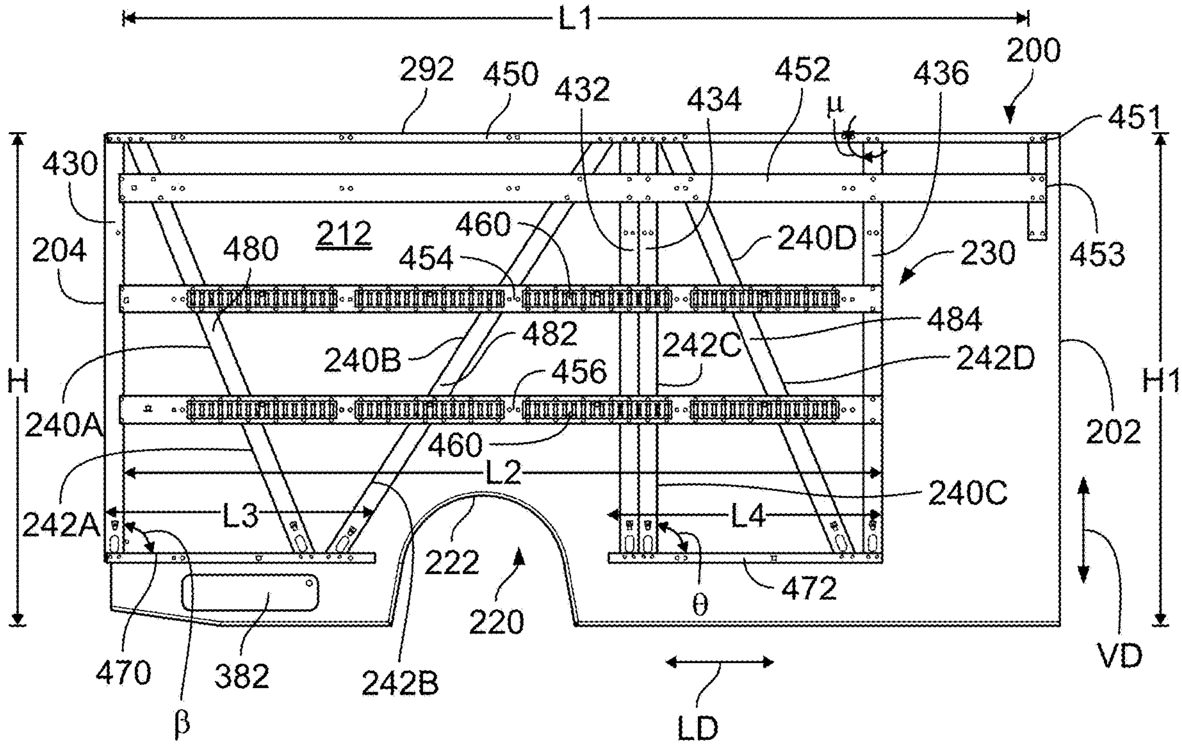
FIG. 4 is a front elevation view of the sidewall of FIG. 2 showing an interior surface thereof and a wall frame assembly mounted to the interior surface.

Referring now to FIGS. 2 and 4, in the illustrative embodiment, the plurality of trusses 240 of the wall frame assembly 230 includes a truss 240A, a truss 240B, a truss 240C, and a truss 240D. The trusses 240A, 240B, 240C, 240D define respective triangular forms 242A, 242B, 242C, 242D. The truss 240A is illustratively disposed rearward (i.e., closer to the rear end 204) of the truss 240B in the longitudinal direction LD. The truss 240B is illustratively disposed rearward of the truss 240C in the longitudinal direction LD. The truss 240C is illustratively disposed rearward of the truss 240D in the longitudinal direction LD.

As best seen in FIG. 4, the illustrative wall frame assembly 230 includes vertical bars 430, 432, 434, 436 each arranged to extend parallel to the vertical direction VD when the wall frame assembly 230 is mounted to the interior surface 212 of the side panel 210. Using the vertical bar 430 as an example, when mounted to the interior surface 212, the vertical bar 430 has a height H measured in the vertical direction VD that is less than an entire height H1 of the interior surface 212 measured in the vertical direction VD. In some embodiments, each of the vertical bars 432, 434, 436 has a height measured in the vertical direction VD that is identical or substantially identical to the height H. In other embodiments, however, each of the vertical bars 432, 434, 436 has a height measured in the vertical direction VD that is slightly different (e.g., slightly greater or slightly less than) from the height H.

In the illustrative mounting arrangement of the wall frame assembly 230, the vertical bar 430 is affixed to the interior surface 212 such that the vertical bar 430 and the rear end 204 are aligned in the longitudinal direction LD. As such, the vertical bar 430 is disposed rearward of the vertical bars 432, 434, 436, and the cutout 220 in the longitudinal direction LD. The vertical bars 432, 434, 436 are disposed forward of the cutout 220 in the longitudinal direction LD.

Further, in the illustrative mounting arrangement of the wall frame assembly 230, the vertical bars 432, 434 are positioned side-by-side in the longitudinal direction LD with minimal, if any, space therebetween. In some embodiments, the vertical bars 432, 434 are arranged in contact with one another. In any case, in the illustrative mounting arrangement, the vertical bar 432 is arranged closer to the cutout 220 than the vertical bar 434 in the longitudinal direction LD. The vertical bar 436 is arranged forward of the vertical bars 432, 434 in the longitudinal direction LD.

The plurality of crossbars 250 of the wall frame assembly 230 illustratively includes crossbars 450, 452, 454, 456 spaced from one another in the vertical direction VD. When mounted to the interior surface 212 of the side panel 210, each of the crossbars 450, 452, 454, 456 is arranged to extend parallel to the longitudinal direction LD. The crossbar 450 is affixed to the interior surface 212 such that the crossbar 450 is aligned with the upper edge 292 of the side panel 210 in the vertical direction VD. The crossbar 452 is affixed to the interior surface 212 such that the crossbar 452 is disposed beneath the crossbar 450 in the vertical direction VD relative to the upper edge 292. The crossbar 454 is affixed to the interior surface 212 such that the crossbar 454 is disposed beneath the crossbar 452 in the vertical direction VD relative to the upper edge 292. The crossbar 456 is affixed to the interior surface 212 such that the crossbar 456 is disposed beneath the crossbar 454 in the vertical direction VD relative to the upper edge 292.

In the illustrative mounting arrangement of the wall frame assembly 230, the crossbars 450, 452 are affixed to the interior surface 212 such that each of the crossbars 450, 452 extends over a length L1 measured in the longitudinal direction LD. In the illustrative embodiment, the length L1 of each of the crossbars 450, 452 is slightly less than the entire length L of the sidewall 200. In other embodiments, however, the length L1 of each of the crossbars 450, 452 may be equal or substantially equal to the entire length L of the sidewall 200. In any case, as best seen in FIG. 4, each of the crossbars 450, 452 extends in the longitudinal direction LD beyond the trusses 240A, 240B, 240C, 240D.

Further, in the illustrative mounting arrangement of the wall frame assembly 230, the crossbars 454, 456 are affixed to the interior surface 212 such that each of the crossbars 454, 456 extends over a length L2 measured in the longitudinal direction LD. In the illustrative embodiment, the length L2 of each of the crossbars 454, 456 is less than the length L1 of each of the crossbars 450, 452. Unlike each of the crossbars 450, 452, each of the crossbars 454, 456 does not extend in the longitudinal direction LD beyond the trusses 240A, 240B, 240C, 240D. Additionally, unlike each of the crossbars 450, 452, each of the crossbars 454, 456 includes rack mounts 460 for shelving (not shown in FIG. 4).

When mounted to the interior surface 212 of the side panel 210, the crossbar 450 is illustratively coupled to each of the vertical bars 430, 432, 434, 436. More specifically, in the illustrative embodiment, the crossbar 450 is in direct contact with each of the vertical bars 430, 432, 434, 436 along, or in close proximity to, the upper edge 292 of the side panel 210. The crossbar 450 illustratively extends in the longitudinal direction LD from the vertical bar 430 to an end 451 located forward of the vertical bar 436.

Like the crossbar 450, when mounted to the interior surface 212 of the side panel 210, the crossbar 452 is illustratively coupled to each of the vertical bars 430, 432, 434, 436. More specifically, in the illustrative embodiment, the crossbar 452 is in direct contact with each of the vertical bars 430, 432, 434, 436 at a first location beneath the upper edge 292 of the side panel 210 in the vertical direction VD. The crossbar 452 illustratively extends in the longitudinal direction LD from the vertical bar 430 to an end 453 located forward of the vertical bar 436.

When mounted to the interior surface 212 of the side panel 210, the crossbar 454 is illustratively coupled to each of the vertical bars 430, 432, 434, 436. More specifically, in the illustrative embodiment, the crossbar 454 is in direct contact with each of the vertical bars 430, 432, 434, 436 at a second location beneath the upper edge 292 of the side panel 210 in the vertical direction VD. The crossbar 454 illustratively extends in the longitudinal direction LD from the vertical bar 430 to the vertical bar 436.

Like the crossbar 454, when mounted to the interior surface 212 of the side panel 210, the crossbar 456 is illustratively coupled to each of the vertical bars 430, 432, 434, 436. More specifically, in the illustrative embodiment, the crossbar 456 is in direct contact with each of the vertical bars 430, 432, 434, 436 at a third location beneath the upper edge 292 of the side panel 210 in the vertical direction VD. The crossbar 456 illustratively extends in the longitudinal direction LD from the vertical bar 430 to the vertical bar 436.

The illustrative wall frame assembly 230 includes horizontal bars 470, 472 that are separate from the crossbars 450, 452, 454, 456 as best seen in FIG. 4. Unlike each of the crossbars 450, 452, 454, 456, each of the horizontal bars 470, 472 does not extend in the longitudinal direction LD across the trusses 240A, 240B, 240C, 240D. However, similar to each of the crossbars 450, 452, 454, 456, each of the horizontal bars 470, 472 is arranged to extend parallel to the longitudinal direction LD when mounted to the interior surface 212 of the side panel 210.

In the illustrative embodiment, the horizontal bar 470 is in direct contact with the vertical bar 430 (i.e., a lower end of the vertical bar 430) and extends in the longitudinal direction LD from the vertical bar 430 toward the cutout 220. The horizontal bar 470 is located in close proximity to the opening 382 and positioned above the opening 382 in the vertical direction VD relative to the lower edge 222 of the side panel 210. The horizontal bar 470 extends over a length L3 measured in the longitudinal direction LD. The length L3 of the horizontal bar 470 is illustratively less than the length L2 of each of the crossbars 454, 456.

In the illustrative embodiment, when mounted to the interior surface 212, the horizontal bar 472 is disposed forward of the horizontal bar 470 in the longitudinal direction LD. Additionally, in the illustrative embodiment, the horizontal bars 470, 472 are aligned or substantially aligned in the vertical direction VD. The horizontal bar 472 is in direct contact with each of the vertical bars 432, 434, 436 (i.e., lower ends of the bars 432, 434, 436). The horizontal bar 472 extends over a length L4 measured in the longitudinal direction LD that is illustratively less than the length L2 of each of the crossbars 454, 456. In some embodiments, the length L4 is the same or substantially the same as the length L3. In other embodiments, the length L4 is slightly different from the length L3.

The illustrative wall frame assembly 230 includes oblique bars 480, 482, 484 that are spaced from one another in the longitudinal direction LD as best seen in FIG. 4. When mounted to the interior surface 212 of the side panel 210, each of the oblique bars 480, 482, 484 extends at an angle relative to the crossbar 450 and, as further discussed below, at least partially defines the triangular form of at least one of the triangular forms 242A, 242B, 242C, 242D of the corresponding trusses 240A, 240B, 240C, 240D. In the illustrative embodiment, each of the oblique bars 480, 482, 484 extends between the crossbar 450 and the horizontal bar 470 or the horizontal bar 472.

In the illustrative embodiment, the oblique bar 480 is arranged in direct contact with the crossbar 450 and the horizontal bar 470 and is coupled to the vertical bar 430. Additionally, the oblique bar 480 is arranged in direct contact with the crossbars 452, 454, 456. The vertical bar 430, the horizontal bar 470, and the oblique bar 480 cooperate to define the illustrative closed triangular form 242A of the truss 240A. The closed triangular form 242A of the truss 240A includes, or is otherwise embodied as, a right triangle. The vertical bar 430 and the horizontal bar 470 extend perpendicular to one another to define an angle β therebetween that is equal or substantially equal to 90 degrees.

The oblique bar 482 is illustratively arranged in direct contact with the horizontal bar 470 and the crossbar 450 and is coupled to the vertical bar 432. Additionally, the oblique bar 482 is arranged in direct contact with the crossbars 452, 454, 456. The oblique bar 480, the oblique bar 482, and the crossbar 450 cooperate to define the illustrative closed triangular form 242B of the truss 240B. The closed triangular form 242B of the truss 240B includes, or is otherwise embodied as, an acute triangle.

The oblique bar 484 is illustratively arranged in direct contact with the crossbar 450 and the horizontal bar 472 and is coupled to the vertical bars 432, 434 and the vertical bar 436. Additionally, the oblique bar 484 is arranged in direct contact with the crossbars 452, 454, 456. The vertical bars 432, 434, the horizontal bar 472, and the oblique bar 484 cooperate to define the illustrative closed triangular form 242C of the truss 240C. The closed triangular form 242C of the truss 240C includes, or is otherwise embodied as, a right triangle. The vertical bars 432, 434 and the horizontal bar 472 extend perpendicular to one another to define an angle θ therebetween that is equal or substantially equal to 90 degrees.

In the illustrative embodiment, the oblique bar 484, the vertical bar 436, and the crossbar 450 cooperate to define the closed triangular form 242D of the truss 240D. The closed triangular form 242D of the truss 240D includes, or is otherwise embodied as, a right triangle. The vertical bar 436 and the crossbar 450 extend perpendicular to one another to define an angle μ therebetween that is equal or substantially equal to 90 degrees.

Figure 5:
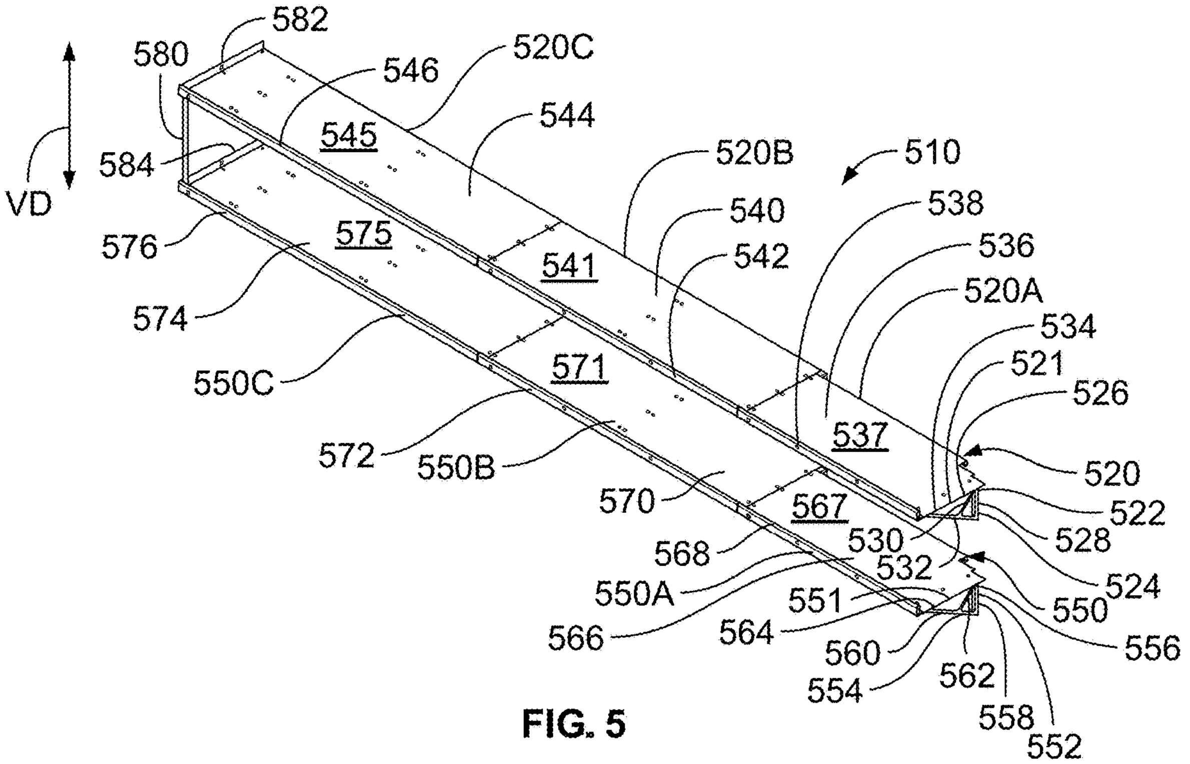
FIG. 5 is a perspective view of shelving adapted for mounting to the wall frame assembly shown in FIG. 4.

Referring now to FIG. 5, shelving 510 is illustratively adapted to be supported by the wall frame assembly 230 when the wall frame assembly 230 is mounted to the interior surface 212 of the side panel 210 as discussed above. More specifically, at least in some embodiments, the shelving 510 is adapted for mounting to the rack mounts 460 of the crossbars 454, 456 so that the shelving 510 is supported by the wall frame assembly 230 when mounted via the rack mounts 460. In the illustrative embodiment, the shelving 510 includes a first shelf assembly 520 and a second shelf assembly 550 coupled to the first shelf assembly 520. In other embodiments, however, the shelving 510 may include another suitable number of shelf assemblies, such as more than two shelf assemblies, for example.

The illustrative shelf assembly 520 includes a shelf frame 522 adapted for mounting to the wall frame assembly 230 (e.g., using the rack mounts 460) when the wall frame assembly 230 is mounted to the interior surface 212. In the illustrative embodiment, the shelf frame 522 includes least one support bracket 524 configured for direct interaction and/or contact with the wall frame assembly 230 to mount the shelf frame 522 to the wall frame assembly 230. In some embodiments, the shelf frame 522 may include multiple support brackets 524 spaced apart from another along the length of the shelf assembly 520 to facilitate securement of the shelf assembly 520 to the wall frame assembly 230 at multiple locations. In other embodiments, the shelf frame 522 may include a single support bracket 524 that extends continuously all the way along the length of the shelf assembly 520. In any case, at least one support bracket 524 is illustratively disposed proximate an end 521 of the shelf assembly 520.

Figure 6:
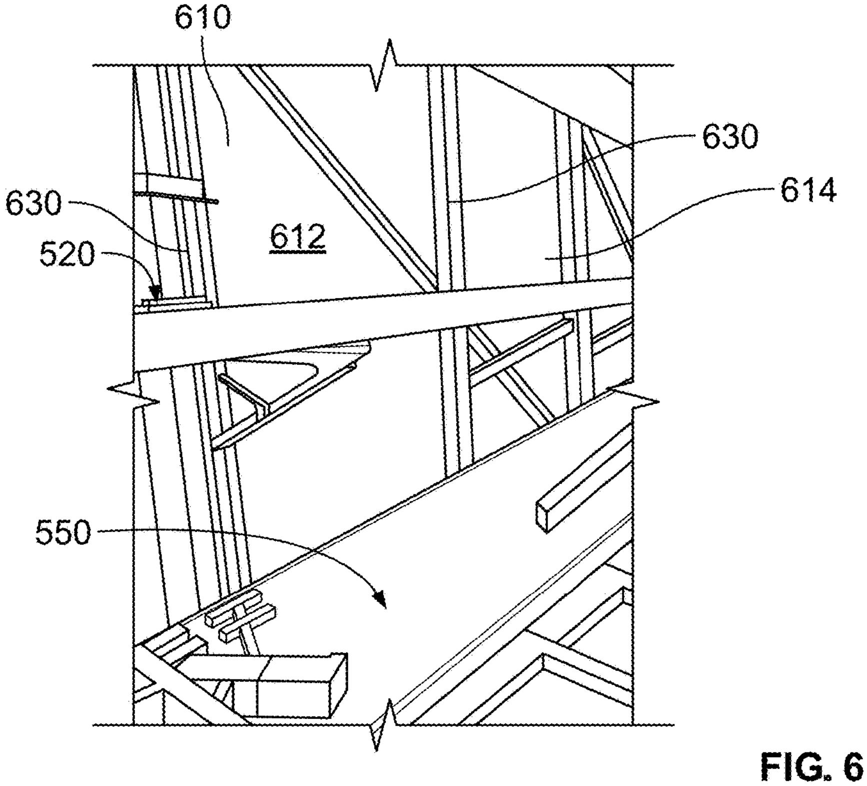
FIG. 6 is a perspective view of shelving similar to the shelving shown in FIG. 5 mounted to a wall frame assembly.

In the illustrative embodiment, as best seen in FIGS. 5 and 6, the at least one support bracket 524 includes a linkage 526 having support arms 528, 530, 532, 534 that are coupled to one another. When viewed from the side, the linkage 526 has a triangular profile and/or form (i.e., a right triangular profile/form). Of course, it should be appreciated that the profile and/or form of the linkage 526 may be selected depending on the particular configuration for mounting the shelf assembly 520 to the wall frame assembly 230. Regardless, each of the support arms 528, 530, 532, 534 includes, or is otherwise embodied as, a structural link, bar, beam, member, rod, or the like.

The illustrative shelf assembly 520 includes separate and distinct shelving units 520A, 520B, 520C that are coupled to one another along the length of the shelf assembly 520. In the illustrative embodiment, the shelving unit 520A includes the at least one support bracket 524. In some embodiments, at least two of the shelving units 520A, 520B, 520C include at least one support bracket 524. In some embodiments still, each of the shelving units 520A, 520B, 520C includes at least one support bracket 524.

In some embodiments, when mounted to the wall frame assembly 230 and positioned in the interior space 214 at least partially defined by the interior surface 212, the shelving unit 520A may be disposed forward (e.g., closer to the front end 202 of the sidewall 200) of the shelving units 520B, 520C in the longitudinal direction LD. In those embodiments, the shelving unit 520B may be disposed forward of the shelving unit 520C in the longitudinal direction LD. Of course, it should be appreciated that in other embodiments, the shelving unit 520A may be disposed rearward (e.g., closer to the rear end 204 of the sidewall 200) of the shelving units 520B, 520C in the longitudinal direction LD, and the shelving unit 520B may be disposed rearward of the shelving unit 520C in the longitudinal direction LD.

The illustrative shelving unit 520A includes a base plate 536 and an edge strip 538 affixed to the base plate 536. The base plate 536 and the edge strip 538 are coupled to the shelf frame 522 in the illustrative embodiment and supported by the shelf frame 522 when the shelving unit 520A is mounted to the wall frame assembly 230. In some embodiments, the base plate 536 defines a support surface 537 for supporting one or more objects placed on the shelving 510. Additionally, in some embodiments, the edge strip 538 provides protection from at least one edge of the base plate 536 that may be contacted by a user positioned in the interior space 214.

The illustrative shelving unit 520B includes a base plate 540 and an edge strip 542 affixed to the base plate 540. In some embodiments, when the shelving units 520A, 520B are connected to one another as shown in FIG. 5, the base plate 540 and the edge strip 542 are coupled to the shelf frame 522 and supported by the shelf frame 522 when the shelving units 520A, 520B are mounted to the wall frame assembly 230. In some embodiments, the base plate 540 defines a support surface 541 for supporting one or more objects placed on the shelving 510. Additionally, in some embodiments, the edge strip 542 provides protection from at least one edge of the base plate 540 that may be contacted by a user positioned in the interior space 214.

The illustrative shelving unit 520C includes a base plate 544 and an edge strip 546 affixed to the base plate 544. In some embodiments, when the shelving units 520A, 520B, 520C are connected to one another as shown in FIG. 5, the base plate 544 and the edge strip 546 are coupled to the shelf frame 522 and supported by the shelf frame 522 when the shelving units 520A, 520B, 520C are mounted to the wall frame assembly 230. In some embodiments, the base plate 544 defines a support surface 545 for supporting one or more objects placed on the shelving 510. Additionally, in some embodiments, the edge strip 546 provides protection from at least one edge of the base plate 544 that may be contacted by a user positioned in the interior space 214.

The illustrative shelf assembly 550 includes a shelf frame 552 adapted for mounting to the wall frame assembly 230 (e.g., using the rack mounts 460) when the wall frame assembly 230 is mounted to the interior surface 212. In the illustrative embodiment, the shelf frame 552 includes least one support bracket 554 configured for direct interaction and/or contact with the wall frame assembly 230 to mount the shelf frame 552 to the wall frame assembly 230. In some embodiments, the shelf frame 552 may include multiple support brackets 554 spaced apart from another along the length of the shelf assembly 550 to facilitate securement of the shelf assembly 550 to the wall frame assembly 230 at multiple locations. In other embodiments, the shelf frame 552 may include a single support bracket 554 that extends continuously all the way along the length of the shelf assembly 550. In any case, at least one support bracket 554 is illustratively disposed proximate an end 551 of the shelf assembly 550.

In the illustrative embodiment, as best seen in FIGS. 5 and 6, the at least one support bracket 554 includes a linkage 556 having support arms 558, 560, 562, 564 that are coupled to one another. When viewed from the side, the linkage 556 has a triangular profile and/or form (i.e., a right triangular profile/form). Of course, it should be appreciated that the profile and/or form of the linkage 556 may be selected depending on the particular configuration for mounting the shelf assembly 550 to the wall frame assembly 230. Regardless, each of the support arms 558, 560, 562, 564 includes, or is otherwise embodied as, a structural link, bar, beam, member, rod, or the like.

The illustrative shelf assembly 550 includes separate and distinct shelving units 550A, 550B, 550C that are coupled to one another along the length of the shelf assembly 550. In the illustrative embodiment, the shelving unit 550A includes the at least one support bracket 554. In some embodiments, at least two of the shelving units 550A, 550B, 550C include at least one support bracket 554. In some embodiments still, each of the shelving units 550A, 550B, 550C includes at least one support bracket 554.

In some embodiments, when mounted to the wall frame assembly 230 and positioned in the interior space 214 at least partially defined by the interior surface 212, the shelving unit 550A may be disposed forward (e.g., closer to the front end 202 of the sidewall 200) of the shelving units 550B, 550C in the longitudinal direction LD. In those embodiments, the shelving unit 550B may be disposed forward of the shelving unit 550C in the longitudinal direction LD. Of course, it should be appreciated that in other embodiments, the shelving unit 550A may be disposed rearward (e.g., closer to the rear end 204 of the sidewall 200) of the shelving units 550B, 550C in the longitudinal direction LD, and the shelving unit 550B may be disposed rearward of the shelving unit 550C in the longitudinal direction LD.

The illustrative shelving unit 550A includes a base plate 566 and an edge strip 568 affixed to the base plate 566. The base plate 566 and the edge strip 568 are coupled to the shelf frame 552 in the illustrative embodiment and supported by the shelf frame 552 when the shelving unit 550A is mounted to the wall frame assembly 230. In some embodiments, the base plate 566 defines a support surface 567 for supporting one or more objects placed on the shelving 510. Additionally, in some embodiments, the edge strip 568 provides protection from at least one edge of the base plate 566 that may be contacted by a user positioned in the interior space 214.

The illustrative shelving unit 550B includes a base plate 570 and an edge strip 572 affixed to the base plate 570. In some embodiments, when the shelving units 550A, 550B are connected to one another as shown in FIG. 5, the base plate 570 and the edge strip 572 are coupled to the shelf frame 552 and supported by the shelf frame 552 when the shelving units 550A, 550B are mounted to the wall frame assembly 230. In some embodiments, the base plate 570 defines a support surface 571 for supporting one or more objects placed on the shelving 510. Additionally, in some embodiments, the edge strip 572 provides protection from at least one edge of the base plate 570 that may be contacted by a user positioned in the interior space 214.

The illustrative shelving unit 550C includes a base plate 574 and an edge strip 576 affixed to the base plate 574. In some embodiments, when the shelving units 550A, 550B, 550C are connected to one another as shown in FIG. 5, the base plate 574 and the edge strip 576 are coupled to the shelf frame 552 and supported by the shelf frame 552 when the shelving units 550A, 550B, 550C are mounted to the wall frame assembly 230. In some embodiments, the base plate 574 defines a support surface 575 for supporting one or more objects placed on the shelving 510. Additionally, in some embodiments, the edge strip 576 provides protection from at least one edge of the base plate 574 that may be contacted by a user positioned in the interior space 214.

In the illustrative embodiment, the shelving units 520C, 550C are coupled to one another via a coupling rod 580 that extends in the vertical direction VD from the shelving unit 520C to the shelving unit 550C. Further, in the illustrative embodiment, a stiffener bracket 582 is affixed to the base plate 544 such that the stiffener bracket 582 and the edge strip 546 are arranged orthogonal to one another. Further still, in the illustrative embodiment, a stiffener bracket 584 is affixed to the base plate 574 such that the stiffener bracket 584 and the edge strip 576 are arranged orthogonal to one another.

Referring now to FIG. 6, the shelf assemblies 520, 550 are illustratively mounted to an interior surface 612 of a side panel 610 such that the shelf assemblies 520, 550 are accessible from an interior space 614 at least partially defined by the interior surface 612. In the illustrative embodiment, the shelf assemblies 520, 550 (i.e., the corresponding shelf frames 522, 552) are mounted to wall studs 630 that are directly affixed to the interior surface 612. The wall studs 630 include, or are otherwise embodied as, posts, bars, rods, or the like which are arranged to extend in a vertical direction (e.g., the vertical direction VD) and spaced from one another in a longitudinal direction (e.g., the longitudinal direction LD).

In some embodiments, the wall studs 630 may be incorporated into, or otherwise form a portion of, the wall frame assembly 230. In such embodiments, the wall studs 630 may be utilized in combination with the rack mounts 460 to mount the shelf assemblies 520, 550. In other embodiments, however, the wall studs 630 may be employed in lieu of, and/or as an alternative to, the rack mounts 460. In other embodiments still, the wall studs 630 may be omitted and the rack mounts 460 may be employed in lieu of, and/or as an alternative to, the wall studs 630.

Referring now to FIGS. 7A, 8A, and 8B, the illustrative seatbelt tower assembly 720 includes the bottom plate 820, the upright post 830, an oblique support leg 850, an oblique support leg 860, a mount plate 870, and a bulkhead plate 880. As evident from the discussion that follows, in some embodiments, the structures 820, 830, 850, 860, 870, 880 may be coupled to one another using fasteners or other suitable coupling devices. However, in other embodiments, the structures 820, 830, 850, 860, 870, 880, as well as subcomponents of the assembled structures 820, 830, 850, 860, 870, 880, may be welded to one another or coupled to one another via adhesives.

As mentioned above, the bottom plate 820 is affixed to at least one support bracket 1110 (see FIGS. 11A and 11B) that is directly coupled to the frame structure 710 proximate the floor 722, and the upright post 830 is coupled to the bottom plate 820 and extends upwardly away from the bottom plate 820 in the vertical direction VD. The oblique support leg 850 is directly coupled to the upright post 830 at one end 852 thereof and to the bottom plate 820 at another end 854 thereof opposite the one end 852. The oblique support leg 860 is directly coupled to the upright post 830 at one end 862 thereof and to the mount plate 870 at another end 864 thereof opposite the one end 862. The bottom plate 820 and the mount plate 870 are spaced from one another. The bulkhead plate 880 is arranged in direct contact with the upright post 830 at the upper end 832 thereof.

The bottom plate 820 illustratively includes a foundation plate 822 and a rail edge 824 interconnected with the foundation plate 822 and arranged to extend perpendicular thereto. The foundation plate 822 and the rail edge 824 cooperate to define an L-shaped cross section of the illustrative bottom plate 820. In use of the seatbelt tower assembly 720, the foundation plate 822 (i.e., a lowermost surface thereof) is directly affixed to the at least one support bracket 1110 and arranged parallel or substantially parallel to the floor 722. As further discussed below, in the illustrative embodiment, the foundation plate 822 is directly affixed to two support brackets 1110A and 1110B coupled to the frame structure 710 proximate the floor 722.

The illustrative foundation plate 822 of the bottom plate 820 includes aperture clusters 826A, 826B as best seen in FIGS. 8A and 8B. In the illustrative embodiment, each of the aperture clusters 826A, 826B includes three apertures extending through the foundation plate 822 which are arranged in a L-shaped configuration or layout. Each aperture cluster 826A, 826B is configured to receive the corresponding mounting posts of one of the support brackets 1110A, 1110B as discussed below. When viewed in the orientation shown in FIG. 7A, the aperture clusters 826A, 826B are spaced from one another in the longitudinal direction LD.

When the seatbelt tower assembly 720 is installed as shown in FIG. 7A, the illustrative rail edge 824 of the bottom plate 820 is arranged to extend perpendicular to the floor 722. The rail edge 824 is illustratively affixed to, and in direct contact with, the end 854 of the oblique support leg 850 and a lower end 834 of the upright post 830. To affix the rail edge 824 to the end 854 of the oblique support leg 850 and the lower end 834 of the upright post 830, at least in some embodiments, the rail edge 824 is formed to include holes 828A, 828B. Of course, it should be appreciated that the holes 828A, 828B may be sized to receive one or more fasteners used to secure the rail edge 824 to the oblique support leg 850 and the upright post 830. As evident from the orientation of the rail edge 824 depicted in FIG. 7A, the holes 828A, 828B are spaced from one another in the longitudinal direction LD.

The upright post 830 illustratively extends from the lower end 834 to the upper end 832 as best seen in FIGS. 8A and 8B. The upright post 830 includes a first face 836 having a bore 836A extending therethrough at the lower end 834 of the post 830 and bores 836B, 836C, 836D extending therethrough at the upper end 832 of the post 830. In some embodiments, the bore 836A is formed in the post 830 in alignment with the hole 828A formed in the rail edge 824. Additionally, in some embodiments, the bores 836B, 836C, 836D may be used to secure the seatbelt mount 740 to the upper end 832 of the upright post 830 when the seatbelt tower assembly 720 is installed as shown in FIG. 7A.

As best seen in FIG. 8B, in the illustrative embodiment, the upright post 830 includes a second face 838 having a slot 838A formed therein that is sized to at least partially receive the end 852 of the oblique support leg 850. The face 838 is illustratively arranged perpendicular to the face 836 and opposite a face 840 of the upright post 830. When the seatbelt tower assembly 720 is assembled, the oblique support leg 850 is arranged in direct contact with the face 838 of the upright post 830 and the oblique support leg 860 is arranged in direct contact with the face 840 of the upright post 830.

The oblique support leg 850 illustratively extends from the lower end 854 to the upper end 852 as best seen in FIGS. 8A and 8B. The oblique support leg 850 is formed to include a first face 856 having a bore 856A extending therethrough at the lower end 854 and a bore 856B extending therethrough at the upper end 852. In some embodiments, the bore 856A is formed in the oblique support leg 850 in alignment with the hole 828A formed in the rail edge 824. Additionally, in some embodiments, the bore 856B is formed in the oblique support leg 850 in alignment with the bore 836C formed in the upright post 830. In any case, in the illustrative embodiment, the upper end 852 of the oblique support leg 850 is sized to be at least partially received in the slot 838A formed in the upright post 830 such that the bore 856B is positioned in the slot 838A. When the seatbelt tower assembly 720 is assembled and the oblique support leg 850 is at least partially received in the slot 838A, the bottom plate 820, the upright post 830, and the oblique support leg 850 cooperate to define a closed right triangular form of the seatbelt tower assembly 720.

The oblique support leg 860 illustratively extends from the lower end 864 to the upper end 862 as best seen in FIGS. 8A and 8B. Although not shown, it should be appreciated that the upper end 862 of the oblique support leg 860 may be formed to include one or more apertures sized to receive one or more fasteners for affixing the upper end 862 to the face 840 of the upright post 830. Additionally, although not shown, it should be appreciated that the lower end 864 of the oblique support leg 860 may be formed to include one or more apertures sized to receive one or more fasteners for affixing the lower end 864 to the mount plate 870.

The mount plate 870 illustratively includes, or is otherwise embodied as, a flat bar, strip, plate, or the like having apertures 870A, 870B extending therethrough as best seen in FIGS. 8A and 8B. In the illustrative embodiment, the apertures 870A, 870B are sized to receive and/or interact with a frame component 712 (see FIG. 7A) that is included in, forms a portion of, or is otherwise coupled to, the frame structure 710 to secure the mount plate 870 to the frame structure 710. In some embodiments, as best seen in FIG. 7A, the frame component 712 includes a bracket 714 mounted to a bridge plate 716 that extends laterally between opposite frame rails 718, 722 of the frame structure 710. In other embodiments, however, the frame component 712 may include other structures suitable for coupling and/or interaction with the mount plate 870 to secure the mount plate 870 to the frame structure 710.

The bulkhead plate 880 is illustratively arranged in direct contact with, and affixed to, the face 840 of the upright post 830 as best seen in FIGS. 8A and 8B. In the illustrative embodiment, the bulkhead plate 880 is formed to include apertures 880A, 880B, 880C extending therethrough that are sized to receive one or more fasteners for directly coupling the bulkhead plate 880 to a vertical bulkhead 724 (see FIG. 7A). As best seen in FIG. 7A, the illustrative bulkhead 724 at least partially closes off the operator cabin 758 from an interior space 762 of the rear compartment 760.

Referring now to FIGS. 7A, 7B, 9A, and 9B, in the illustrative embodiment, the seat frame assembly 730 supported by the frame structure 710 is configured to support a seat 732 for a passenger in the operator cabin 758. The seat frame assembly 730 is laterally spaced from the seatbelt tower assembly 720 to at least partially define an entryway 764 therebetween into the rear compartment 760 from the operator cabin 758. In the illustrative positioning, the seat frame assembly 730 and the seatbelt tower assembly 720 are aligned or substantially aligned in the longitudinal direction LD and arranged at a forward end 768 of the rear compartment 760.

The illustrative seat frame assembly 730 includes a forward mounting plate 920, a rear mounting plate 930, an upright post 940, an oblique support leg 960, a jumpseat main plate 970, and a jumpseat rib 980. As evident from the discussion that follows, in some embodiments, the structures 920, 930, 940, 960, 970, 980 may be coupled to one another using fasteners or other suitable coupling devices. However, in other embodiments, the structures 920, 930, 940, 960, 970, 980, as well as subcomponents of the assembled structures 920, 930, 940, 960, 970, 980, may be welded to one another or coupled to one another via adhesives.

The forward and rear mounting plates 920, 930 are illustratively arranged proximate the floor 722 as shown in FIG. 7A when the seat frame assembly 730 is installed (e.g., in the vehicle 150). The forward mounting plate 920 is arranged forward of the rear mounting plate 930 in the longitudinal direction LD. The upright post 940 is directly affixed to the forward mounting plate 920 and extends upwardly away from the mounting plate 920 in the vertical direction VD. The oblique support leg 960 is directly affixed to the upright post 940 and the rear mounting plate 930 such that the oblique support leg 960 extends at an acute angle relative to each of the upright post 940 and the rear mounting plate 930. The jumpseat main plate 970 is directly affixed to the upright post 940 and the jumpseat rib 980 is directly affixed to the jumpseat main plate 970. The jumpseat main plate 970 and the jumpseat rib 980 are arranged to extend in the vertical direction VD parallel or substantially parallel to the upright post 940.

Figure 9B:
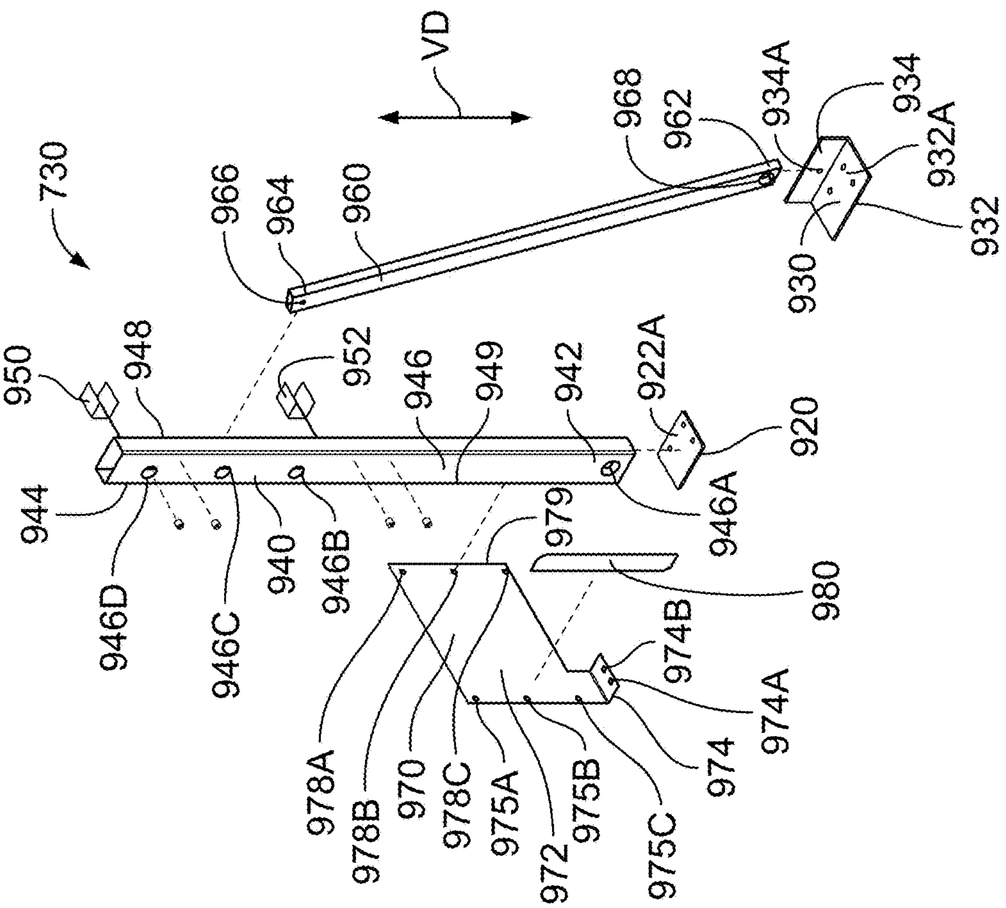
FIG. 9B is an exploded assembly view of the portion of the seat frame assembly shown in FIG. 9A.
Figure 9A:
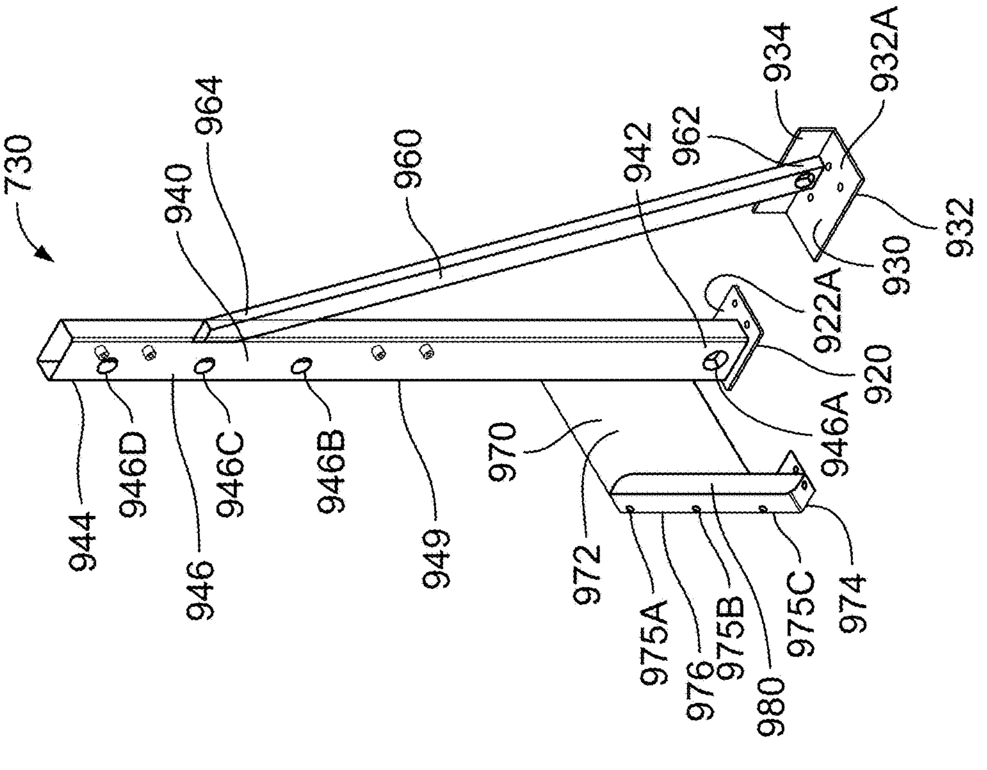
FIG. 9A is a perspective view of at least a portion of the seat frame assembly shown in FIG. 7 which is removed from the electric vehicle for the sake of simplicity.

The forward mounting plate 920 illustratively includes, or is otherwise embodied as, a flat bar, strip, plate, or the like having an aperture cluster 922A formed therein as best seen in FIGS. 9A and 9B. In the illustrative embodiment, the aperture cluster 922A includes three apertures extending through the forward mounting plate 920 which are arranged in a L-shaped configuration or layout. The aperture cluster 922A is configured to receive the corresponding mounting posts of the support bracket 1110C as discussed below. The forward mounting plate 920 is arranged in direct contact with a lower end 942 of the upright post 940.

The rear mounting plate 930 illustratively includes a foundation plate 932 and a rail edge 934 interconnected with the foundation plate 932 and arranged to extend perpendicular thereto. The foundation plate 932 and the rail edge 934 cooperate to define an L-shaped cross section of the illustrative rear mounting plate 930. In use of the seat frame assembly 730, the foundation plate 932 (i.e., a lowermost surface thereof) is directly affixed to a support bracket 1110D and arranged parallel or substantially parallel to the floor 722.

The illustrative foundation plate 932 of the rear mounting plate 930 has an aperture cluster 932A formed therein as best seen in FIGS. 9A and 9B. In the illustrative embodiment, the aperture cluster 932A includes three apertures extending through the rear mounting plate 930 which are arranged in a L-shaped configuration or layout. The aperture cluster 932A is configured to receive the corresponding mounting posts of the support bracket 1110D as discussed below. The rear mounting plate 930 is arranged in direct contact with a lower end 962 of the oblique support leg 960.

When the seat frame assembly 730 is installed as shown in FIG. 7A, the illustrative rail edge 934 of the rear mounting plate 930 is arranged to extend perpendicular to the floor 722. The rail edge 934 is illustratively affixed to, and in direct contact with, the lower end 962 of the oblique support leg 960. To affix the rail edge 934 to the end 962 of the oblique support leg 960, the rail edge 934 is formed to include a hole 934A. Of course, it should be appreciated that the hole 934A may be sized to receive one or more fasteners used to secure the rail edge 934 to the oblique support leg 960.

The upright post 940 illustratively extends from the lower end 942 to an upper end 944 as best seen in FIGS. 9A and 9B. The upright post 940 includes a first face 946 having a bore 946A extending therethrough at the lower end 942 of the post 940 and bores 946B, 946C, 946D extending therethrough at the upper end 944 of the post 940. In some embodiments, at least one of the bores 946B, 946C, 946D (e.g., the bore 946C) may be used to secure an upper end 964 of the oblique support leg 960 to the upright post 940 when the seat frame assembly 730 is installed as shown in FIG. 7A.

As best seen in FIG. 9B, in the illustrative embodiment, the upright post 940 includes a second face 948 arranged opposite the face 946 that is in direct contact with the upper end 964 of the oblique support leg 960 when the seat frame assembly 730 is assembled. Mount clips 950, 952 are illustratively directly affixed to the face 948 such that the mount clips 950, 952 are spaced from one another in the vertical direction VD. When mounted to the face 948, the mount clip 950 is aligned or substantially aligned with the bore 946D in the vertical direction VD, and the mount clip 952 is arranged below the bores 946B, 946C, 946D in the vertical direction VD. Each of the illustrative mount clips 950, 952 may be formed to include an aperture (not shown) to facilitate mounting of the clips 950, 952 to the face 948 using one or more fasteners.

The oblique support leg 960 illustratively extends from the lower end 962 to the upper end 964. In the illustrative embodiment, the upper end 964 of the oblique support leg 960 is formed to include at least one aperture 966 that is sized to receive one or more fasteners for affixing the upper end 964 to the face 948 of the upright post 940. Additionally, in the illustrative embodiment, the lower end 962 of the oblique support leg 960 is formed to include at least one aperture 968 that is sized to receive one or more fasteners for affixing the lower end 962 to the rear mounting plate 930. In some embodiments, the aperture 968 may be formed in the oblique support leg 960 in alignment with the hole 934A formed in the rail edge 934.

The jumpseat main plate 970 illustratively includes a main body 972 and a support foot 974 appended to the main body 972. The main body 972 includes a first aperture cluster having apertures 975A, 975B, 975C formed in close proximity to one lateral edge 976 and a second aperture cluster having apertures 978A, 978B, 978C formed in close proximity to another lateral edge 979 arranged opposite the lateral edge 976. At least one of the apertures 978A, 978B, 978C is adapted to receive one or more fasteners to directly affix the main body 972 to a face 949 of the upright post 940 that interconnects the faces 946, 948.

The support foot 974 of the jumpseat main plate 970 is illustratively arranged to extend perpendicular to the main body 972 as best seen in FIGS. 9A and 9B. The support foot 974 illustratively includes, or is otherwise embodied as, a flat tab, bar, strip, plate, or the like having apertures 974A, 974B extending therethrough. In the illustrative embodiment, the apertures 974A, 974B are sized to receive and/or interact with a frame component 726 (see FIG. 7A) that is included in, forms a portion of, or is otherwise coupled to, the frame structure 710 to secure the jumpseat main plate 970 to the frame structure 710. In some embodiments, as best seen in FIG. 7A, the frame component 726 includes a bracket 728 mounted to the bridge plate 716 that extends laterally between the opposite frame rails 718, 722 of the frame structure 710. In other embodiments, however, the frame component 726 may include other structures suitable for coupling and/or interaction with the jumpseat main plate 970 to secure the main plate 970 to the frame structure 710.

When the seat frame assembly 730 is assembled as shown in FIG. 9A, the jumpseat rib 980 is directly affixed to the jumpseat main plate 970 adjacent the lateral edge 976. In some embodiments, the jumpseat rib 980 is directly affixed to the jumpseat main plate 970 such that the jumpseat rib 980 is in direct contact with the main body 972 and the support foot 974. Additionally, in some embodiments, the jumpseat rib 980 includes, or is otherwise embodied as, a bar, strip, plate, or the like that extends in the vertical direction VD and is configured to stiffen and/or provide rigidity to the jumpseat main plate 970 when affixed thereto.

Figure 7B:
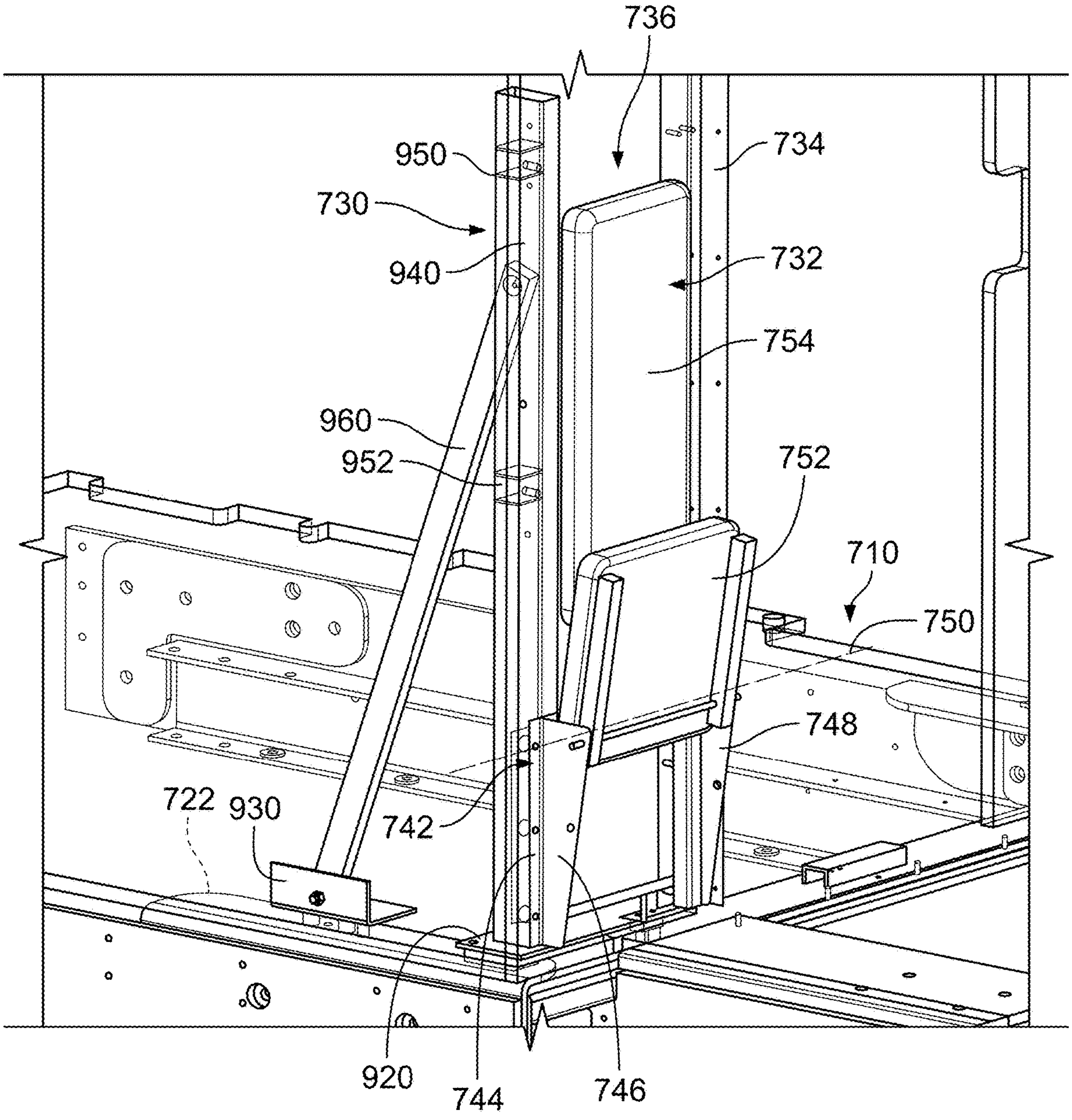
FIG. 7B is another perspective view of the seat frame assembly shown in FIG. 7A.

As best seen in FIG. 7B, when the illustrative seat frame assembly 730 is installed (e.g., in the vehicle 150), a vertical column 734 coupled to the frame structure 710 supports a backplane 736 that extends laterally between the vertical column 734 and the upright post 940. In the illustrative embodiment, the vertical column 734 and the vertical bulkhead 724 cooperate to define the entryway 764. Like the bulkhead 724, at least in some embodiments, the vertical column 734 and the backplane 736 at least partially close off the operator cabin 758 from the interior space 762 of the rear compartment 760. Further, in at least some embodiments, the seat frame assembly 730 is coupled to, and at least partially reinforced by, the vertical column 734 and the backplane 736.

In the illustrative embodiment, the seat 732 includes a base frame 742, a seat rest 752, and a back rest 754. In some embodiments, the base frame 742 may be coupled to, form a portion of, or otherwise be included in, the jumpseat main plate 970. The base frame 742 includes a main support plate 744, a first support fin 746 coupled to the main support plate 744 that extends outwardly therefrom, and a second support fin 748 coupled to the main support plate 744 that extends outwardly therefrom. In at least some embodiments, the seat rest 752 is positioned between the support fins 746, 748 and pivotally coupled to the support fins 746, 748 for rotation about a lateral axis 750 between a stowed position (shown in FIG. 7B) and a deployed position (not shown). As the case may be, the stowed position of the seat rest 752 may correspond to a non-occupied (i.e., by a passenger) position of the seat 732, and the deployed position of the seat rest 752 may correspond to an occupied (i.e., by a passenger) position of the seat 732. Further, in some embodiments, the back rest 754 may be coupled to, and supported by, the backplane 736.

Figure 10:
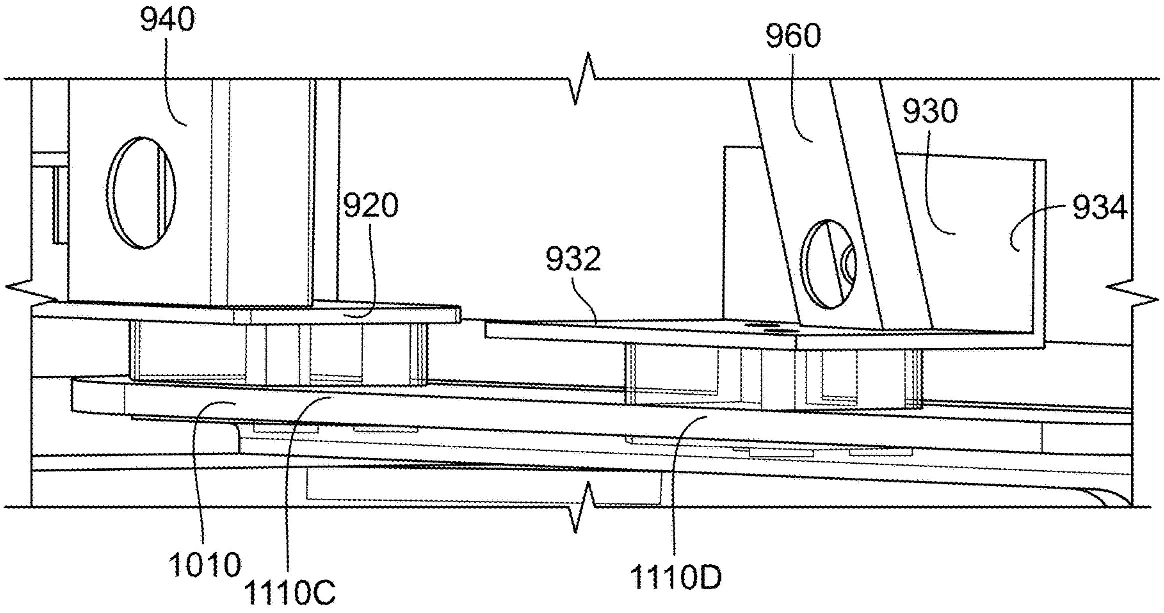
FIG. 10 is a magnified perspective view of at least one support bracket used to couple at least one component of the seat frame assembly or the seatbelt tower assembly shown in FIG. 7 to a frame structure of the electric vehicle.
Figure 11A:
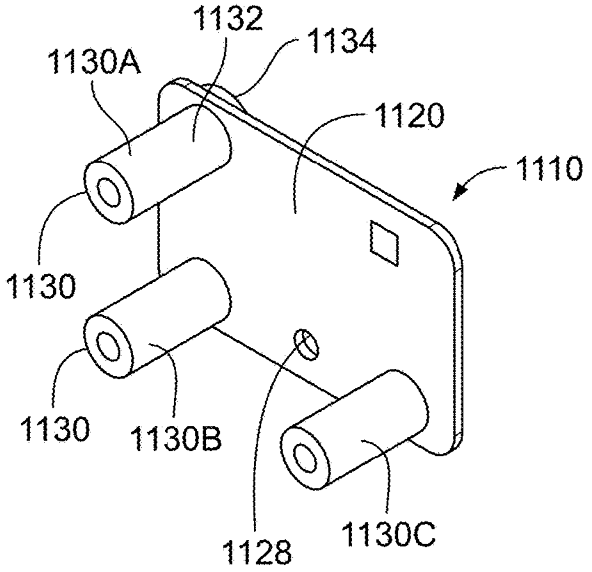
FIG. 11A is a perspective view of the support bracket shown in FIG. 10 removed from the electric vehicle for the sake of simplicity.
Figure 11B:
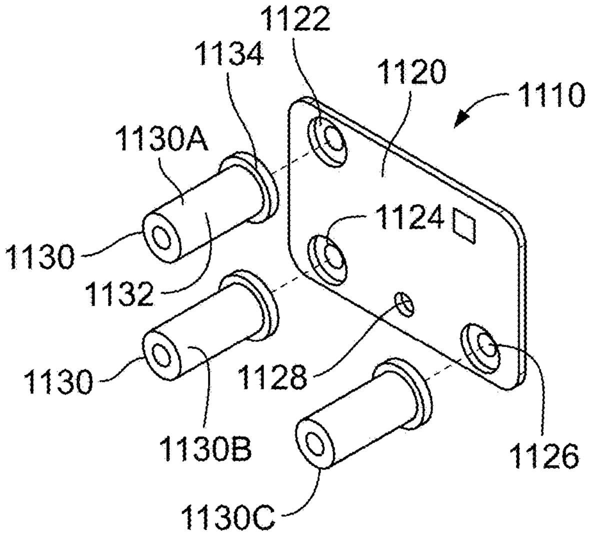
FIG. 11B is an exploded assembly view of the support bracket shown in FIG. 11A.

Referring now to FIGS. 10, 11A, and 11B, interaction between the forward mounting plate 920 and the support bracket 1110C and between the rear mounting plate 930 and the support bracket 1110D is illustrated when the seat frame assembly 730 is installed (e.g., in the vehicle 150). For the purposes of the present disclosure, it should be appreciated that the support brackets 1110C, 1110D are identical or substantially identical to one another and to the support brackets 1110A, 1110B mentioned above. Additionally, for the sake of simplicity, it should be appreciated that interaction between the forward mounting plate 920 and the support bracket 1110C is similar or substantially similar to interaction between the rear mounting plate 930 and the support bracket 1110D.

In the illustrative embodiment, each of the support brackets 1110 includes a faceplate 1120 and mounting posts 1130 affixed thereto such that the mounting posts 1130 extend outwardly away from the faceplate 1120. The mounting posts 1130 illustratively include three identical or substantially identical mounting posts 1130A, 1130B, 1130C arranged in a L-shaped configuration or layout. As best seen in FIG. 11B, the illustrative mounting posts 1130A, 1130B, 1130C are provided separately from the faceplate 1120 and sized for receipt in corresponding apertures 1122, 1124, 1126 extending through the faceplate 1120.

In the illustrative embodiment, the faceplate 1120 is also formed to include a passage 1128 arranged between the apertures 1124, 1126. A diameter of the passage 1128 is illustratively less than a diameter of each of the apertures 1122, 1124, 1126, and the apertures 1122, 1124, 1126 have the same or substantially the same diameter. Using the mounting post 1130A as an example, the mounting post 1130A includes a shaft 1132 and a head 1134 coupled to the shaft 1132 that has a greater diameter than a diameter of the shaft 1132. In at least some embodiments, the diameter of the head 1134 may be greater than the diameter of each of the apertures 1122, 1124, 1126. Consequently, when the mounting post 1130A is received in the aperture 1122 as best seen in FIG. 11A, the shaft 1132 and the head 1134 may be disposed on opposite sides of the faceplate 1120.

In the case of the illustrative support bracket 1110C, the configuration or layout of the mounting posts 1130A, 1130B, 1130C is complementary to the configuration or layout of the apertures of the aperture cluster 922A formed in the forward mounting plate 920, and the mounting posts 1130A, 1130B, 1130C are at least partially received by the apertures of the aperture cluster 922A, at least in some embodiments. In the case of the illustrative support bracket 1110D, the configuration or layout of the mounting posts 1130A, 1130B, 1130C is complementary to the configuration or layout of the apertures of the aperture cluster 932A formed in the rear mounting plate 930, and the mounting posts 1130A, 1130B, 1130C are at least partially received by the apertures of the aperture cluster 932A, at least in some embodiments.

In some embodiments, as best seen in FIGS. 7A and 10, the support brackets 1110C, 1110D are integrated into, form a portion of, or are otherwise coupled to a reinforcement brace 1010 that is directly affixed to the frame rail 722 of the frame structure 710. Additionally, as shown in FIG. 7A, the support brackets 1110A, 1110B are integrated into, form a portion of, or are otherwise coupled to a reinforcement brace 708 that is directly affixed to the frame rail 718 of the frame structure 710. The reinforcement braces 708, 1010 are therefore coupled to the respective frame rails 718, 722 opposite one another.

Figure 12:
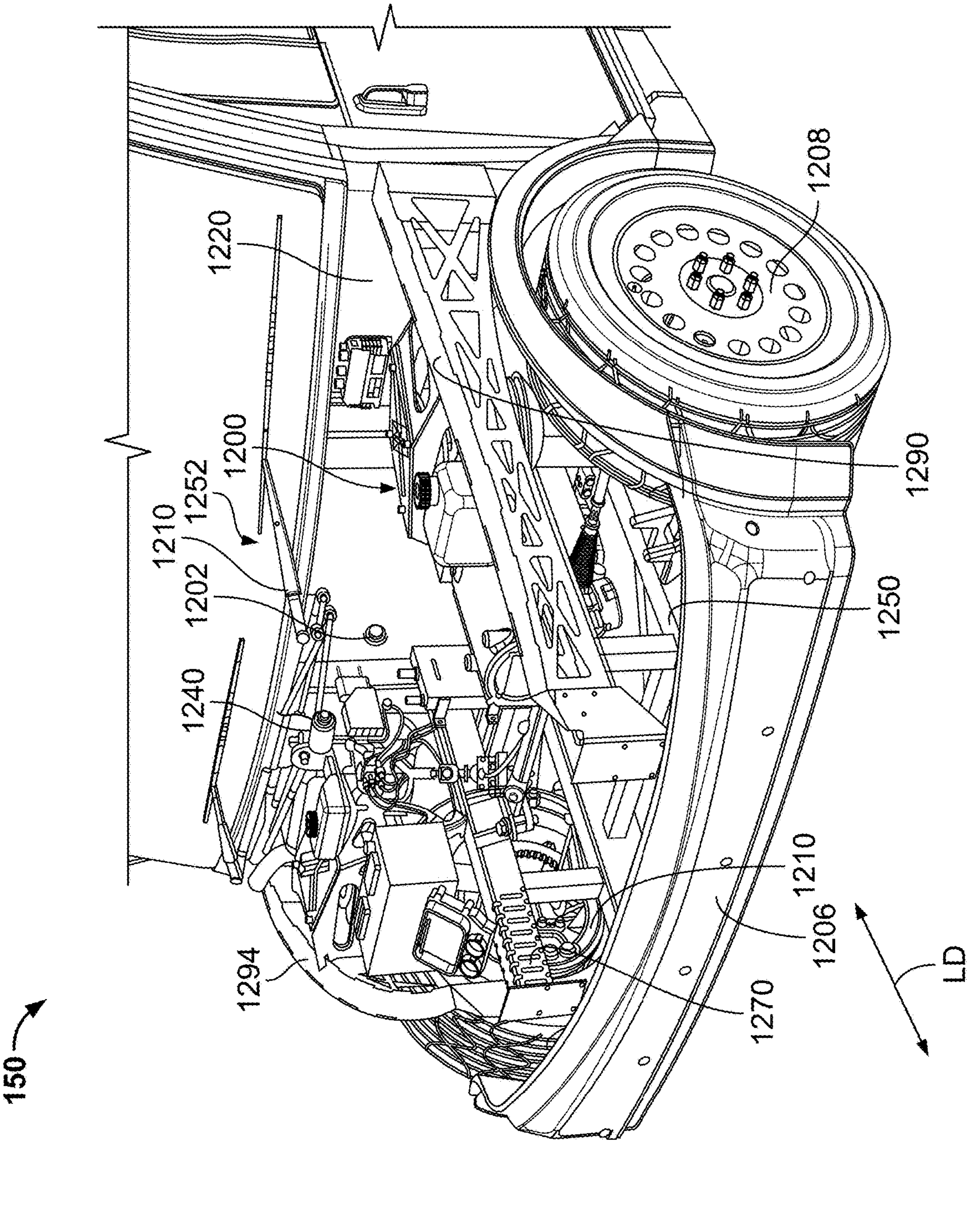
FIG. 12 is a front perspective view showing an impact management system arranged in an internal cavity of one or more of the electric vehicles of FIG. 1 according to certain embodiments of the disclosure.

Referring now to FIG. 12, in at least some embodiments, the electric vehicle 150 may include an impact management system 1200 arranged in an internal cavity 1202 beneath a hood 1252 of the vehicle 150. The illustrative impact management system 1200 is configured to deform in response to impact forces applied thereto in use of the vehicle 150 to maintain structural integrity of the operator cage (e.g., the operator cage defining the operator cabin 758) and rails 1302, 1304 of the frame structure 1300 (see FIG. 13). In some embodiments, the rails 1302, 1304 may be identical or substantially identical to the frame rails 718, 722 of the frame structure 710.

It should be appreciated that the illustrative impact management system 1200 is configured to dissipate energy and/or forces applied to the vehicle 150 during an impact event or crash. Of course, energy and/or forces resulting from an impact event may be applied to the vehicle 150 at various locations. In one example, such energy and/or forces may be applied to the vehicle 150 at a location proximate a front end 1206 of the vehicle 150 and in a direction generally parallel to the longitudinal direction LD (e.g., during a head-on collision). In another example, such energy and/or forces may be applied to the vehicle 150 near one or more of the front wheels 1208 thereof and in a direction generally perpendicular to the longitudinal direction LD (e.g., during a side collision). Regardless, as a consequence of the energy dissipation effected by the illustrative impact management system 1200, lower magnitude energy and/or forces may be transmitted to other components of the vehicle 150. In some cases, deformation of the illustrative impact management system 1200 is associated with, or otherwise corresponds to, minimal transmission of energy and/or forces resulting from an impact event to the operator cage and the rails 1302, 1304 such that those components remain substantially intact during the impact event.

Figure 13:
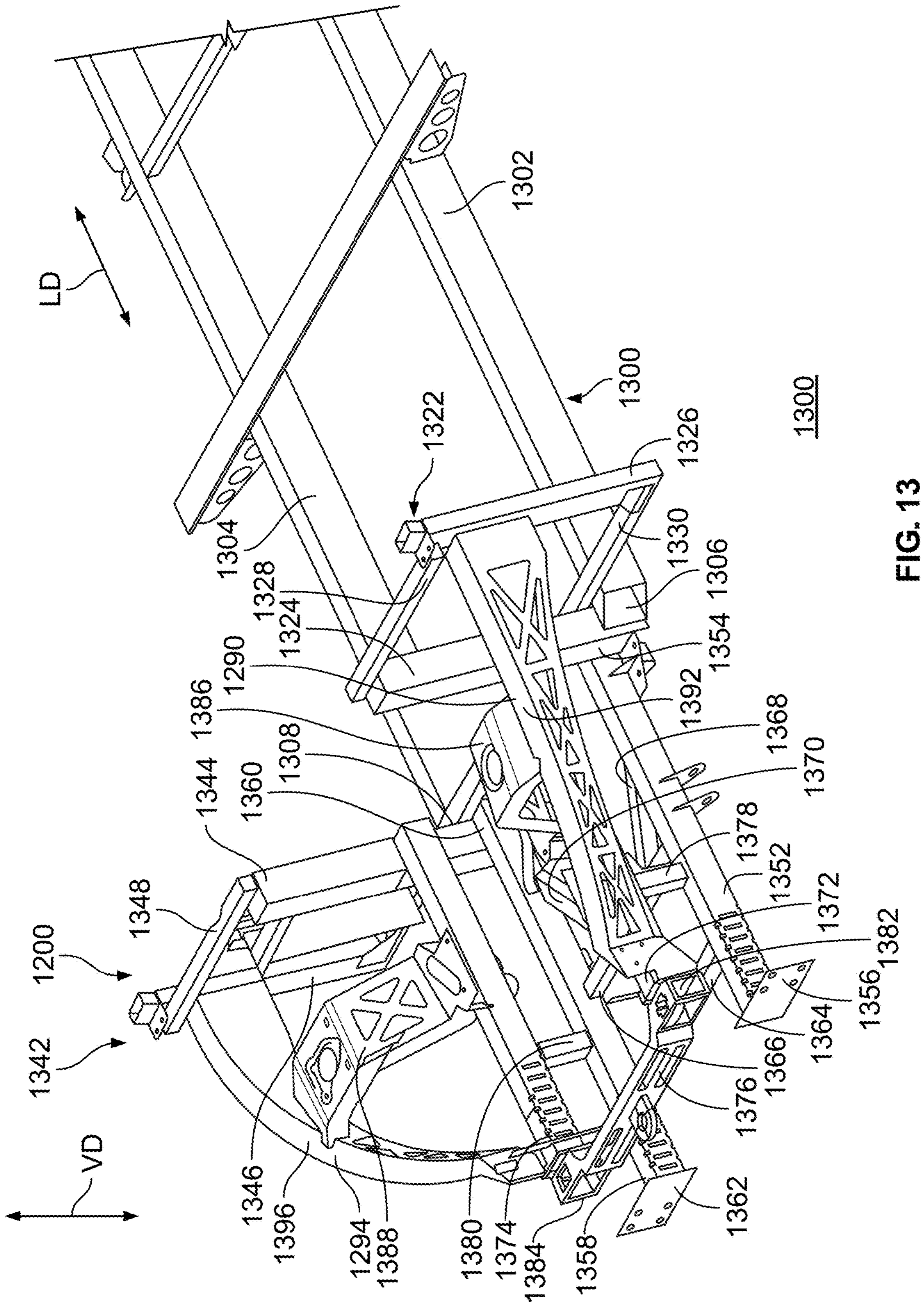
FIG. 13 is a front perspective view of the impact management system depicted in FIG. 12 coupled to a frame structure of the electric vehicle.

Referring now to FIGS. 12 and 13, in the illustrative embodiment, the impact management system 1200 includes a crash cage 1210 that extends in the longitudinal direction LD from ends 1306, 1308 of the rails 1302, 1304 to the front end 1206 of the vehicle 150. In the illustrative embodiment, the crash cage 1210 includes a post assembly 1220, a post assembly 1240, a lower crash assembly 1250, an upper crash assembly 1270, an outrigger structure 1290, and an outrigger structure 1294, among other things, as described in greater detail below. The impact management system 1200 extends in the vertical direction VD between a lower end 1207 and an upper end 1209.

The illustrative post assembly 1220 includes, or otherwise defines, a four-bar linkage 1322 that is generally aligned with the rail 1302 in the longitudinal direction LD at the end 1306 of the rail 1302. In the illustrative embodiment, the post assembly 1220 includes an upright inner post 1324, an upright outer post 1326, an upper link 1328, and a base link 1330. The upright inner post 1324 is directly affixed to the rail 1302 at the end 1306 thereof. The upright outer post 1326 is spaced from the upright inner post 1324 in the lateral direction such that the outer post 1326 is located outwardly of the inner post 1324 in the lateral direction. The upper link 1328 extends in the lateral direction from the inner post 1324 to the outer post 1326. The base link 1330 extends in the lateral direction from the upright outer post 1326 to an upright outer post 1346 of the post assembly 1240. The base link 1330 is illustratively positioned vertically beneath the upper link 1328 relative to a support surface 1300. The upright inner post 1324, the upright outer post 1326, the upper link 1328, and the base link 1330 illustratively cooperate to at least partially define the four-bar linkage 1322.

The illustrative post assembly 1240 includes, or otherwise defines, a four-bar linkage 1342 that is aligned with the rail 1304 in the longitudinal direction LD at the end 1308 of the rail 1304. In the illustrative embodiment, the post assembly 1240 includes an upright inner post 1344, the upright outer post 1346, an upper link 1348, and the base link 1330. The upright inner post 1344 is directly affixed to the rail 1304 at the end 1308 thereof. The upright outer post 1346 is spaced from the upright inner post 1344 in the lateral direction such that the outer post 1346 is located outwardly of the inner post 1344 in the lateral direction. The upper link 1348 extends in the lateral direction from the inner post 1344 to the outer post 1346. The base link 1330 is illustratively positioned vertically beneath the upper link 1348 relative to the support surface 1300. The upright inner post 1344, the upright outer post 1346, the upper link 1348, and the base link 1330 illustratively cooperate to at least partially define the four-bar linkage 1342.

In the illustrative embodiment, the lower crash assembly 1250 at least partially defines a lower portion of the impact management system 1200 in the vertical direction VD. The illustrative crash assembly 1250 includes a lower beam or crash tube 1352, a lower beam or crash tube 1358, a crossbar 1364, a crossbar 1366, a strut 1368, and a strut 1370. Those components of the crash assembly 1250 are described in greater detail below.

The illustrative lower beam 1352 is directly affixed to the upright inner post 1324 of the post assembly 1220. The lower beam 1352 extends parallel to the rail 1302 in the longitudinal direction LD and is aligned with the rail 1302 in the vertical direction VD. The lower beam 1352 extends in the longitudinal direction LD from an end 1354 coupled to the inner post 1324 to an end 1356 arranged adjacent the front end 1206 of the vehicle 150.

The illustrative lower beam 1358 is spaced from the beam 1352 in the lateral direction and directly affixed to the upright inner post 1344 of the post assembly 1240. The lower beam 1358 extends parallel to the rail 1304 in the longitudinal direction LD and is aligned with the rail 1304 in the vertical direction VD. The lower beam 1358 extends in the longitudinal direction LD from an end 1360 coupled to the inner post 1344 to an end 1362 arranged adjacent the front end 1206 of the vehicle 150.

The illustrative crossbar 1364 extends in the lateral direction between the lower beams 1352, 1358 and interconnects the lower beams 1352, 1358. The illustrative crossbar 1366 also extends in the lateral direction between the lower beams 1352, 1358 and interconnects the lower beams 1352, 1358. The crossbar 1366 is positioned rearward of the crossbar 1364 in the longitudinal direction LD.

The illustrative strut 1368 is affixed to the lower beam 1352 and the crossbar 1366. More specifically, the strut 1368 is affixed to the lower beam 1352 and the crossbar 1366 such that the strut 1368 is arranged oblique to the lower beam 1352. The illustrative strut 1370 is affixed to the lower beam 1358 and the crossbar 1366. More specifically, the strut 1370 is affixed to the lower beam 1358 and the crossbar 1366 such that the strut 1370 is arranged oblique to the lower beam 1358.

In the illustrative embodiment, the upper crash assembly 1270 is positioned above the lower crash assembly 1250 in the vertical direction VD. The illustrative crash assembly 1270 includes an upper beam 1372, an upper beam 1374, a crash wall 1376, a vertical support 1378, and a vertical support 1380. Those components of the crash assembly 1270 are described in greater detail below.

The illustrative upper beam 1372 is directly affixed to the upright inner post 1324 of the post assembly 1220. The upper beam 1372 extends parallel to the rail 1302 in the longitudinal direction LD and is arranged vertically above the rail 1302 in the vertical direction VD. The upper beam 1372 is interconnected with the lower beam 1352 by the vertical support 1378. The vertical support 1378 is illustratively arranged in the longitudinal direction LD between the crossbars 1364, 1366.

The illustrative upper beam 1374 is spaced from the beam 1372 in the lateral direction and directly affixed to the upright inner post 1344 of the post assembly 1240. The upper beam 1374 extends parallel to the rail 1304 in the longitudinal direction LD and is arranged vertically above the rail 1304 in the vertical direction VD. The upper beam 1374 is interconnected with the lower beam 1358 by the vertical support 1380. The vertical support 1380 is illustratively arranged in the longitudinal direction LD between the crossbars 1364, 1366.

The illustrative crash wall 1376 extends in the lateral direction between the upper beams 1372, 1374 to interconnect the beams 1372, 1374. In the illustrative embodiment, the crash wall 1376 is arranged in the longitudinal direction LD adjacent the front end 1206 of the vehicle 150. In some embodiments, the crash wall 1376 may be coupled to, and provide an interconnection between, the outrigger structures 1290, 1294 adjacent the front end 1206 of the vehicle 150.

The illustrative outrigger structure 1290 is at least partially arranged outwardly of the lower crash assembly 1250 and the upper crash assembly 1270 in the lateral direction. In the illustrative embodiment, the outrigger structure 1290 extends from the upright outer post 1326 of the post assembly 1220 to an end 1382 of the crash wall 1376 that is located adjacent the upper beam 1372. The illustrative outrigger structure 1290 is shaped to define an arc 1392 between the upright outer post 1326 and the end 1382 of the crash wall 1376. At least in some embodiments, the outrigger structure 1290 is configured for deformation in response to forces applied to the vehicle 150 in a direction generally perpendicular to, and not parallel to, the longitudinal direction LD during an impact event (e.g., a side collision).

The illustrative outrigger structure 1294 is at least partially arranged outwardly of the lower crash assembly 1250 and the upper crash assembly 1270 in the lateral direction. In the illustrative embodiment, the outrigger structure 1294 is arranged opposite the outrigger structure 1290 and extends from the upright outer post 1346 of the post assembly 1240 to an end 1384 of the crash wall 1376 that is located adjacent the upper beam 1374. The illustrative outrigger structure 1294 is shaped to define an arc 1396 between the upright outer post 1346 and the end 1384 of the crash wall 1376. At least in some embodiments, the outrigger structure 1294 is configured for deformation in response to forces applied to the vehicle 150 in a direction generally perpendicular to, and not parallel to, the longitudinal direction LD during an impact event (e.g., a side collision).

In the illustrative embodiment, the crash cage 1210 of the impact management system 1200 includes a reinforcement brace 1386 that is coupled between the upper beam 1372 of the upper crash assembly 1270 and the outrigger structure 1290. More specifically, the reinforcement brace 1386 extends outwardly in the lateral direction and upwardly in the vertical direction VD from the upper beam 1372 to the outrigger structure 1290 to interconnect the upper beam 1372 and the outrigger structure 1290. At least in some embodiments, the reinforcement brace 1386 is configured for deformation in response to forces applied to the vehicle 150 in a direction generally perpendicular to, and not parallel to, the longitudinal direction LD during an impact event (e.g., a side collision).

In the illustrative embodiment, the crash cage 1210 of the impact management system 1200 includes a reinforcement brace 1388 that is coupled between the upper beam 1374 of the upper crash assembly 1270 and the outrigger structure 1294. More specifically, the reinforcement brace 1388 extends outwardly in the lateral direction and upwardly in the vertical direction VD from the upper beam 1374 to the outrigger structure 1294 to interconnect the upper beam 1374 and the outrigger structure 1294. At least in some embodiments, the reinforcement brace 1388 is configured for deformation in response to forces applied to the vehicle 150 in a direction generally perpendicular to, and not parallel to, the longitudinal direction LD during an impact event (e.g., a side collision).

Figure 14:
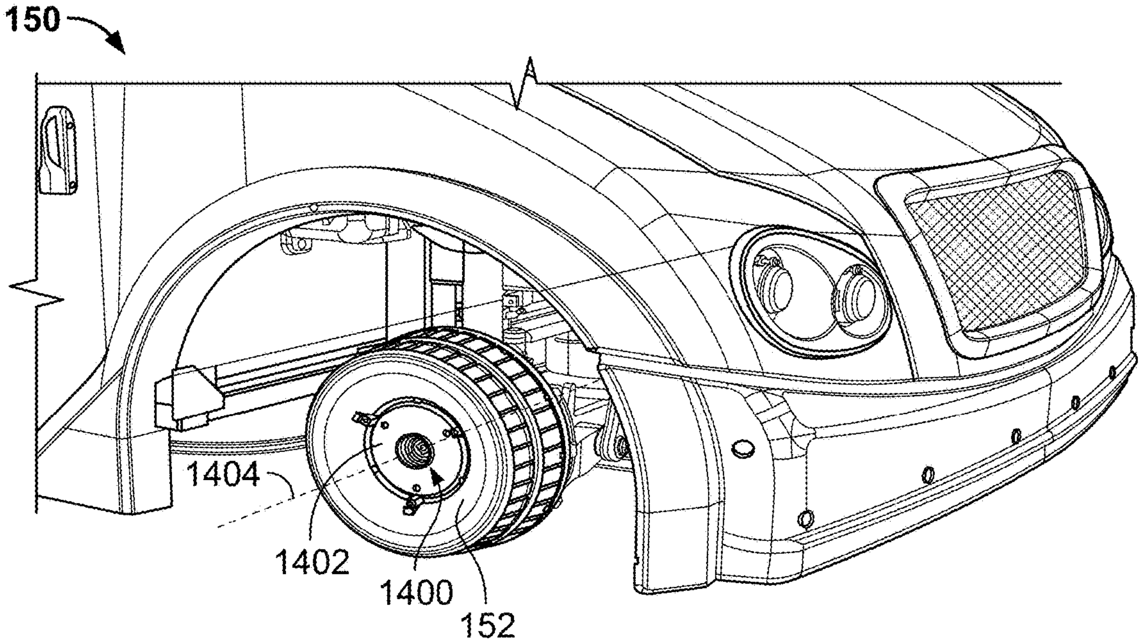
FIG. 14 is a front perspective view showing an electric motor integrated directly into a wheel of one or more of the electric vehicles of FIG. 1 according to certain embodiments of the disclosure.

Referring now to FIG. 14, in the illustrative embodiment, the land vehicle 150 may include electric motors 1400 configured to produce rotational power to drive rotation of the wheels 152 in use of the vehicle 150. Each of the electric or hub motors 1400 may be directly integrated into one of the wheels 152 such that the vehicle 150 includes four electric motors 1400. As shown in FIG. 14, one of the electric motors 1400 (i.e., the electric motor 1402) is directly integrated into the wheel 152.

The illustrative motor 1402 is embodied as, or otherwise includes, any device that is capable of being driven by electrical energy supplied by a power cell assembly (not shown) to produce rotational power. As indicated above, the illustrative motor 1402 is directly integrated into the wheel 152 so that rotational power produced by the motor 1402 is provided directly to the wheel 152 in use of the vehicle 150. At least in some embodiments, the motor 1402 is directly integrated into the wheel 152 such that the motor 1402 and the wheel 152 are concentrically mounted about an axis 1404. In such embodiments, the axis 1404 may define, or otherwise coincide with, a rotational axis of the wheel 152.

In some embodiments, each of the electric motors 1400 is configured to generate about 100 horsepower (hp) in use of the land vehicle 150. In some embodiments, each of the motors 1400 may be embodied as, or otherwise include, a brushed DC motor, a brushless DC motor, a switched reluctance motor, a universal AC/DC motor, an induction motor, a torque motor, a synchronous motor, a doubly-fed electric machine, an ironless or coreless rotor motor, a pancake or axial rotor motor, a servo motor, a stepper motor, a linear motor, or the like. Of course, it should be appreciated that in other embodiments, each of the motors 1400 may be embodied as, or otherwise include, another suitable device capable of converting electrical energy supplied by the power cell assembly to rotational power to drive the wheels 152. In some embodiments, each of the electric motors 1400 is configured to generate a sufficient amount of rotational power and/or motive force to drive movement of one or more of the wheels 152 over an estimated service life of the vehicle 100, which may encompass a significant number of missions and/or delivery trips. In such embodiments, each of the motors 1400 may be configured to generate less than 100 horsepower in use of the vehicle 150 or greater than 100 horsepower in use of the vehicle 150, whatever the case may be.

In some embodiments, each of the electric motors 1400 is coupled to one of the wheels 152 without any transmission gearing interposed therebetween. Even more, at least in some embodiments, the illustrative land vehicle 150 entirely omits one or more transmissions. Consequently, in such embodiments, the land vehicle 150 is free from components that may be present in conventional transmissions, such as torque converters, rotating torque-transmitting mechanisms or clutches, stationary torque-transmitting mechanisms or brakes, transmission gearing, pressure control valves, shift control valves, regulator valves, check valves, and various structural elements of electro-hydraulic control systems. As a result, the powertrain and/or drivetrain of the vehicle 150 may include significantly fewer parts than other configurations, thereby facilitating maintenance, reliability, and reduced design complexity, among other things.

In some embodiments, the electric motors 1400 of the land vehicle 150 are the only components of the vehicle 150 capable of generating rotational power to drive the wheels 152. Further, at least in some embodiments, the illustrative land vehicle 150 does not include an internal combustion engine. As such, the land vehicle 150 is free from a number of components that may be utilized in conventional configurations to transmit rotational power from one or more internal combustion engines to one or more wheels, such as driveshafts, differentials, and axles, just to name a few. In that additional respect, the powertrain and/or drivetrain of the vehicle 150 may include significantly fewer parts than other configurations, which may facilitate maintenance, reliability, and reduced design complexity as mentioned above.

Figure 15:
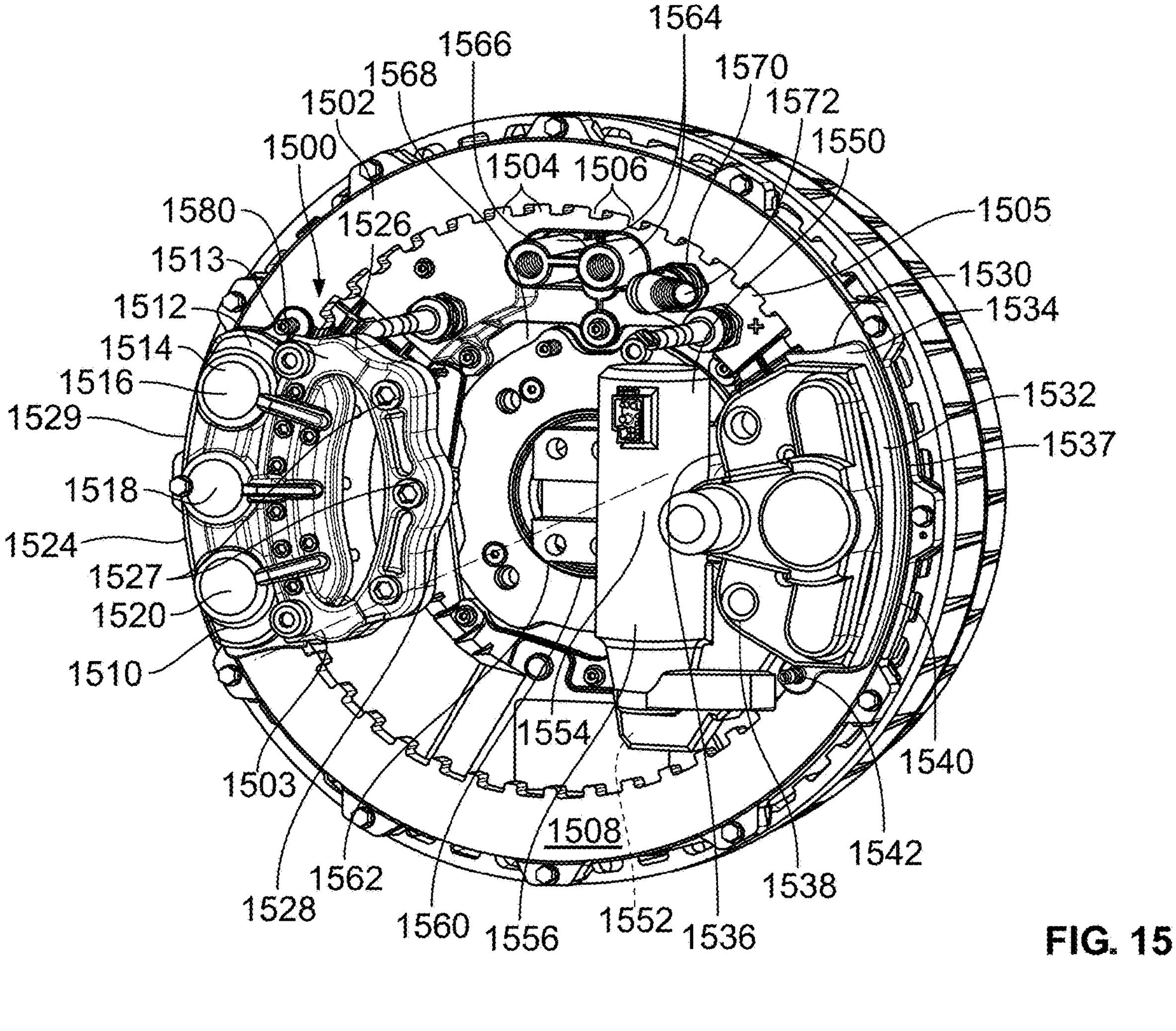
FIG. 15 is a perspective view of a brake system coupled to a wheel of one or more of the electric vehicles of FIG. 1 according to certain embodiments of the disclosure.

Referring now to FIG. 15, in the illustrative embodiment, the land vehicle 150 may include brake systems 1500 configured to resist rotation of the wheels 152 to stop and/or slow the vehicle 150 in use thereof. One brake system 1500 is illustratively coupled to each one of the wheels 152. Each illustrative brake system 1500 includes a disc 1502, a braking device 1510, a braking device 1530, and a braking device 1550. The illustrative disc 1502 includes notches 1504 defined between circumferentially adjacent teeth 1506 of the disc 1502. The illustrative braking device 1510 is configured to contact an outer face 1508 of the disc 1502 to resist rotation of one of the wheels 152 in use of the vehicle 150. The illustrative braking device 1530 is circumferentially spaced from the braking device 1510 about the disc 1502 and configured to contact the outer face 1508 thereof to resist rotation of one of the wheels 152 in use of the vehicle 150. The illustrative braking device 1550 is configured to contact one or more teeth 1506 of the disc 1502 to resist rotation of one of the wheels 152 in use of the vehicle 150. It should be appreciated that any one of the braking devices 1510, 1530, 1550 of each brake system 1500 may be activated to resist rotation of one of the wheels 152 in use of the vehicle 150 and thereby provide redundant braking means. Additionally, it should be appreciated that the multiple braking devices 1510, 1530, 1550 may be activated in combination with one another to cooperatively resist rotation of one of the wheels 152 in use of the vehicle 150.

In the illustrative embodiment, the disc or rotor 1502 of each brake system 1500 is configured for rotation about a rotational axis 1503. The illustrative disc 1502 is coupled to the wheel 152 for common rotation therewith about the axis 1503, at least in some embodiments. Additionally, in some embodiments, the disc 1502 may be integrally formed with the wheel 152. At an inner diameter 1505 thereof, the disc 1502 is formed to include the notches 1504 that are defined between circumferentially adjacent teeth 1506 of the disc 1502.

The illustrative braking device 1510 is configured to contact the outer face 1508 of the disc 1502 to resist rotation of the wheel 152 about the axis 1503 in use of the land vehicle 150. In the illustrative embodiment, the braking device 1510 is embodied as, or otherwise includes, a disc brake assembly. The braking device 1510 includes a caliper 1512, one or more pistons 1514, and brake pads 1524. In addition, the braking device 1510 may include a number of components not depicted in the Figures, such as one or more seals, dust boots, bleeder devices, anti-rattle clips, brake shoes, linings, locating pins, mounting pins, bearings, retainers, caps, anchor plates, mounting plates, spindles, or the like.

The illustrative caliper 1512 of the braking device 1510 is embodied as, or otherwise includes, a housing 1513 of the braking device 1510 that at least partially houses a number of components of the braking device 1510, such as the piston(s) 1514, for example. In the illustrative embodiment, the braking device 1510 includes only one caliper 1512. Furthermore, in the illustrative embodiment, the braking device 1510 includes six pistons (only pistons 1516, 1518, 1520 are shown in FIG. 15) that are at least partially housed by the only one caliper 1512. However, in other embodiments, it should be appreciated that the braking device 1510 may include only one piston. The illustrative braking device 1510 also includes a pair of brake pads (only brake pad 1524 is shown) that are configured to contact opposite sides (i.e., outer and inner sides) of the disc 1502 to resist rotation of the wheel 152 about the axis 1503 in use of the vehicle 150.

The caliper 1512 of the braking device 1510 may have a variety of constructions. In the illustrative example, the caliper 1512 has a two-piece construction in which two parts (only part 1526 is shown) are secured to one another in close proximity to an end 1528 of the caliper 1512 by fasteners 1527. In the illustrative example, the two parts of the caliper 1512 are spaced apart from one another in close proximity to an end 1529 that is arranged opposite the end 1528. The brake pads are coupled to inner sides of the parts and arranged in confronting relation with one another to permit contact between the brake pads and the disc 1502 when the disc 1502 is positioned between the pads adjacent the end 1529. In the illustrative example, a sensor 1580 is coupled to the part 1526 of the caliper 1512 at an outer periphery thereof. The sensor 1580 is configured to provide a signal indicative of wear or degradation of the brake pads in use of the vehicle 150, at least in some embodiments. In other examples, however, the caliper 1512 may have another suitable construction and be formed from another suitable number of parts.

In some embodiments, the wheel 152 illustratively depicted in FIG. 15 is supported for rotation about the rotational axis 1503 by a bearing 1560. In such embodiments, a braking sensor 1562 is integrated into the bearing 1560. The illustrative braking sensor 1562 is configured to provide a signal to a control system (not shown) indicative of a rotational speed of the wheel 152 in use of the vehicle 150, at least in some embodiments. The signal provided by the braking sensor 1562 may be utilized to control one or more components of an anti-lock brake system (not shown) included in the vehicle 150.

In some embodiments, fluid connections 1564 are located radially between the rotational axis 1503 and the inner diameter 1505 of the disc 1502. The fluid connections 1564 may be utilized to circulate cooling fluid delivered from a cooling fluid source (not shown) through the wheel 152 to cool the wheel 152 in use of the vehicle 150, at least in some embodiments. Each of the fluid connections 1564 may be embodied as, or otherwise include, a projection 1566 that extends outwardly away from an interior 1568 of the wheel 152 and parallel to the rotational axis 1503 such that the fluid connections 1564 are generally not recessed. In some embodiments, a connector 1570 is located in the interior 1568 of the wheel 152 adjacent the fluid connections 1564. The connector 1570 may be configured to interface with a single low voltage cable 1572 that is at least partially positioned in the interior 1568.

In the illustrative embodiment, the braking device 1530 is an electronic parking brake mechanism that may be controlled using an EPB switch (not shown). Additionally, in the illustrative embodiment, the braking device 1550 is a parking pawl mechanism. It should be appreciated that in use of the vehicle 150, the braking devices 1530, 1550 may be operated by a control system independently of one another and/or in concert with one another.

As mentioned above, the illustrative electronic parking brake mechanism 1530 is configured to contact the outer face 1508 of the disc 1502 to resist rotation of the wheel 152 about the axis 1503 in use of the vehicle 150. As shown in FIG. 15, the parking brake mechanism 1530 is circumferentially spaced from the braking device 1510 about the disc 1502 and the axis 1503. More specifically, the parking brake mechanism 1530 and the braking device 1510 are circumferentially spaced about 180 degrees from one another about the disc 1502 and the axis 1503. In the illustrative arrangement, among other components, the fluid connections 1564 and the connector 1570 are circumferentially located between the parking brake mechanism 1530 and the braking device 1510.

At least in some embodiments, the illustrative parking brake mechanism 1530 includes a number of features similar to corresponding features of the braking device 1510. In such embodiments, the parking brake mechanism 1530 includes a housing 1532, one or more actuators or pistons 1538 at least partially housed by the housing 1532, and brake pads (only brake 1540 is shown) supported by the housing 1532 that are configured to contact opposite sides (i.e., outer and inner sides) of the disc 1502 to resist rotation of the wheel 152 about the axis 1503 in use of the vehicle 150. In addition, the parking brake mechanism 1530 may include a number of components not depicted in the Figures, such as one or more seals, dust boots, bleeder devices, anti-rattle clips, brake shoes, linings, locating pins, mounting pins, bearings, retainers, caps, anchor plates, mounting plates, spindles, or the like.

The housing 1532 of the parking brake mechanism 1530 may have a variety of constructions. In the illustrative example, the housing 1532 has a two-piece construction in which two parts (only part 1534 is shown) are secured to one another in close proximity to an end 1536 of the housing 1532. In the illustrative example, the parts of the housing 1532 are spaced apart from one another in close proximity to an end 1537 that is arranged opposite the end 1536. The brake pads are coupled to inner sides of the parts and arranged in confronting relation with one another to permit contact between the brake pads and the disc 1502 when the disc 1502 is positioned between the pads adjacent the end 1537. In the illustrative example, a sensor 1542 is coupled to the part 1534 of the housing 1532 at an outer periphery thereof. The sensor 1542 is configured to provide a signal indicative of wear or degradation of the brake pads in use of the vehicle 150, at least in some embodiments. In other examples, however, the housing 1532 may have another suitable construction and be formed from another suitable number of parts.

As mentioned above, the illustrative parking pawl mechanism 1550 is configured to contact one or more teeth 1506 of the disc 1502 to resist rotation of the wheel 152 in use of the vehicle 150. Unlike some conventional devices, the illustrative parking pawl mechanism 1550 is not fitted to, and does not interact with, a transmission of the vehicle 150, since the vehicle 150 omits one or more transmissions as indicated above. Thus, unlike some conventional devices, the illustrative parking pawl mechanism 1550 does not lock an output shaft of a transmission to prevent rotation of the wheel 152.

In the illustrative embodiment, the parking pawl mechanism 1550 includes a pawl or pin 1552 at least partially housed by a housing 1556. The pawl 1552 may be sized to contact one or more of the teeth 1506 in use of the mechanism 1550. Additionally, in some embodiments, the parking pawl mechanism 1550 may include one or more actuators 1554 at least partially housed by the housing 1556. The one or more actuators 1554 are configured to drive movement (e.g., extension) of the pawl 1552 relative to the housing 1556 to contact one or more of the teeth 1506 and thereby resist rotation of the wheel 152, at least in some embodiments. Additionally, in such embodiments, the one or more actuators 1554 are configured to drive movement (i.e., retraction) of the pawl 1552 relative to the housing 1556 to release the pawl 1552 and thereby permit rotation of the wheel 152.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An electric vehicle comprising:
a frame structure;
a plurality of wheels supported by the frame structure; and
a body supported by the frame structure that includes a first sidewall arranged on one side of the vehicle and second sidewall arranged on another side of the vehicle opposite the first sidewall,
wherein:
at least one of the first sidewall and the second sidewall includes a side panel having a side panel length in a longitudinal direction and a wall frame assembly mounted to an interior surface of the side panel that at least partially defines an interior space of the vehicle,
the wall frame assembly includes a first plurality of crossbars each having at least a first length and a second plurality of crossbars each having at least a second length less than the first length, and
each of the first length and the second length is less than the side panel length.

2. The electric vehicle of claim 1, wherein:
the first plurality of crossbars are spaced apart from one another in a vertical direction, and
the second plurality of crossbars are spaced apart from one another in the vertical direction.

3. The electric vehicle of claim 2, wherein:
the first plurality of crossbars are substantially aligned in the longitudinal direction, and
the second plurality of crossbars are substantially aligned in the longitudinal direction.

4. The electric vehicle of claim 3, wherein:
the first plurality of crossbars includes no more than two crossbars, and
the second plurality of crossbars includes no more than two crossbars.

5. The electric vehicle of claim 1, wherein the wall frame assembly includes a third plurality of crossbars each having at least a third length less than the second length.

6. The electric vehicle of claim 5, wherein the third plurality of crossbars includes no more than two crossbars.

7. The electric vehicle of claim 5, wherein the third plurality of crossbars are aligned in a vertical direction.

8. The electric vehicle of claim 5, wherein the third plurality of crossbars are spaced from another in the longitudinal direction.

9. The electric vehicle of claim 8, wherein the third plurality of crossbars are arranged opposite one another relative to a cutout extending through the side panel.

10. An electric vehicle comprising:
a frame structure;
a plurality of wheels supported by the frame structure; and
a body supported by the frame structure that includes a first sidewall arranged on one side of the vehicle and second sidewall arranged on another side of the vehicle opposite the first sidewall,
wherein:
at least one of the first sidewall and the second sidewall includes a side panel having a side panel length in a longitudinal direction and a wall frame assembly mounted to an interior surface of the side panel that at least partially defines an interior space of the vehicle,
the wall frame assembly includes a plurality of trusses each defining at least one triangular form, and
the plurality of trusses extend over a truss length in the longitudinal direction that is less than the side panel length.

11. The electric vehicle of claim 10, wherein each of the plurality of trusses is defined by at least one oblique bar of the wall frame assembly that extends to an upper edge of the side panel.

12. The electric vehicle of claim 11, wherein the at least one oblique bar includes three oblique bars.

13. The electric vehicle of claim 10, wherein the plurality of trusses includes four trusses.

14. The electric vehicle of claim 13, wherein:
a first truss and a second truss are at least partially defined by a first oblique bar of the wall frame assembly, and
a third truss and a fourth truss are at least partially defined by a second oblique bar of the wall frame assembly.

15. The electric vehicle of claim 14, wherein the first oblique bar and the second oblique are spaced apart from one another in the longitudinal direction.

16. The electric vehicle of claim 14, wherein:
the side panel is formed to include a cutout extending through a lower edge thereof, and
the cutout is arranged between the first oblique bar and the second oblique bar in the longitudinal direction.

17. An electric vehicle comprising:

a frame structure;

a plurality of wheels supported by the frame structure; and a body supported by the frame structure that includes a first sidewall arranged on one side of the vehicle and second sidewall arranged on another side of the vehicle opposite the first sidewall, wherein:

at least one of the first sidewall and the second sidewall includes a side panel having a side panel length in a longitudinal direction, a wall frame assembly mounted to an interior surface of the side panel that at least partially defines an interior space of the vehicle, and shelving mounted to the wall frame assembly, and the wall frame assembly includes a first plurality of crossbars each having at least a first length and a second plurality of crossbars each having at least a second length less than the first length.

18. The electric vehicle of claim 17, each of the first length and the second length is less than the side panel length.

19. The electric vehicle of claim 18, wherein:

each of the second plurality of crossbars includes rack mounts, and the shelving is mounted to the second plurality of crossbars via the rack mounts.

20. The electric vehicle of claim 19, wherein each of the first plurality of crossbars is devoid of rack mounts.

* * * * *